United States Patent
Shin et al.

(10) Patent No.: US 12,335,603 B2
(45) Date of Patent: Jun. 17, 2025

(54) ELECTRONIC DEVICE COMPRISING MULTI-CAMERA, AND PHOTOGRAPHING METHOD

(71) Applicant: SAMSUNG ELECTRONICS CO., LTD., Suwon-si (KR)

(72) Inventors: Daekyu Shin, Suwon-si (KR); Yunghak Mo, Suwon-si (KR); Hyungwoo Shin, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/601,954

(22) Filed: Mar. 25, 2024

(65) Prior Publication Data

US 2024/0323514 A1   Sep. 26, 2024

Related U.S. Application Data

(63) Continuation of application No. 17/967,847, filed on Oct. 17, 2022, now Pat. No. 11,956,530, which is a
(Continued)

(30) Foreign Application Priority Data

Apr. 17, 2020   (KR) .................. 10-2020-0046765

(51) Int. Cl.
*H04N 23/63* (2023.01)
*H04N 23/45* (2023.01)
*H04N 23/58* (2023.01)

(52) U.S. Cl.
CPC ........... *H04N 23/632* (2023.01); *H04N 23/45* (2023.01); *H04N 23/58* (2023.01)

(58) Field of Classification Search
None
See application file for complete search history.

(56) References Cited

U.S. PATENT DOCUMENTS 6,795,106 B1  9/2004  Cooper
10,762,372 B2  9/2020  Tojo et al.
(Continued)

FOREIGN PATENT DOCUMENTS

JP   2011155692 A   8/2011
JP      5041757 B2   7/2012
(Continued)

OTHER PUBLICATIONS

English translation of JP-2013162425-A, Kamimura, Aug. 2013 (Year: 2013).*
(Continued)

*Primary Examiner* — James M Hannett
(74) *Attorney, Agent, or Firm* — CANTOR COLBURN LLP

(57) ABSTRACT

An electronic device having a multi-camera, according to various embodiments of the present disclosure, includes: the multi-camera, a display, a memory, and a processor operatively connected to the camera, the display, and the memory. The processor may be configured to receive a first image being photographed at a first angle of view of the camera, receive a second image being photographed at a second angle of view of the camera, identify a subject in the first image according to predetermined criteria, generate a third image in which the identified subject is cropped according to a predetermined area of interest, and display the second image and the third image on at least a portion of an area in which the first image is displayed. Various other embodiments may be possible.

20 Claims, 27 Drawing Sheets

Related U.S. Application Data continuation of application No. PCT/KR2021/003772, filed on Mar. 26, 2021.

(56) References Cited

U.S. PATENT DOCUMENTS

| | | |
|---|---|---|
| 2009/0245573 A1 | 10/2009 | Saptharishi et al. |
| 2009/0309973 A1 | 12/2009 | Kogane |
| 2014/0232906 A1 | 8/2014 | Ha et al. |
| 2014/0285679 A1 | 9/2014 | Saitou |
| 2015/0350523 A1 | 12/2015 | Kinoshita |
| 2015/0350556 A1 | 12/2015 | Lee |
| 2016/0227163 A1 | 8/2016 | Aarrestad et al. |
| 2016/0295157 A1 | 10/2016 | Cho et al. |
| 2017/0280066 A1 | 9/2017 | Hayashi |
| 2019/0166294 A1 | 5/2019 | Ouyang et al. |
| 2019/0191098 A1 | 6/2019 | Ishii et al. |
| 2020/0092465 A1 | 3/2020 | Lee et al. |
| 2020/0177814 A1 | 6/2020 | Enomoto |
| 2020/0314331 A1 | 10/2020 | Ouchi |
| 2021/0225013 A1 | 7/2021 | Kim et al. |
| 2022/0150345 A1 | 5/2022 | Woo et al. |

FOREIGN PATENT DOCUMENTS

| | | | |
|---|---|---|---|
| JP | 2013162425 A | * 8/2013 | ......... H04N 5/23216 |
| JP | 5355446 B2 | 9/2013 | |
| JP | 2015029178 A | 2/2015 | |
| JP | 5720711 B2 | 4/2015 | |
| JP | 6212991 B2 | 9/2017 | |
| JP | 2017175319 A | 9/2017 | |
| JP | 2019110509 A | 7/2019 | |
| JP | 2020088810 A | 6/2020 | |
| JP | 2020136703 A | 8/2020 | |
| KR | 20140104753 A | 8/2014 | |
| KR | 20150137368 A | 12/2015 | |
| KR | 101592889 B1 | 2/2016 | |
| KR | 20190001873 A | 1/2019 | |
| KR | 20190105533 A | 9/2019 | |
| KR | 102126868 B1 | 6/2020 | |
| KR | 20200124870 A | 11/2020 | |
| KR | 20210017282 A | 2/2021 | |
| KR | 102306272 B1 | 9/2021 | |
| KR | 102354960 B1 | 1/2022 | |
| WO | 2021185250 A1 | 9/2021 | |
| WO | 2021185296 A1 | 9/2021 | |

OTHER PUBLICATIONS

International Search Report; International Application No. PCT/KR2021/003772; International Filing Date: Mar. 26, 2021; Date of mailing: Jun. 24, 2021; 68 pages.

Korean Intellectual Property Office Action corresponding to Application No. 10-2020-0046765; Filing Date: Apr. 17, 2020; Mailing Date: Mar. 20, 2024.

* cited by examiner

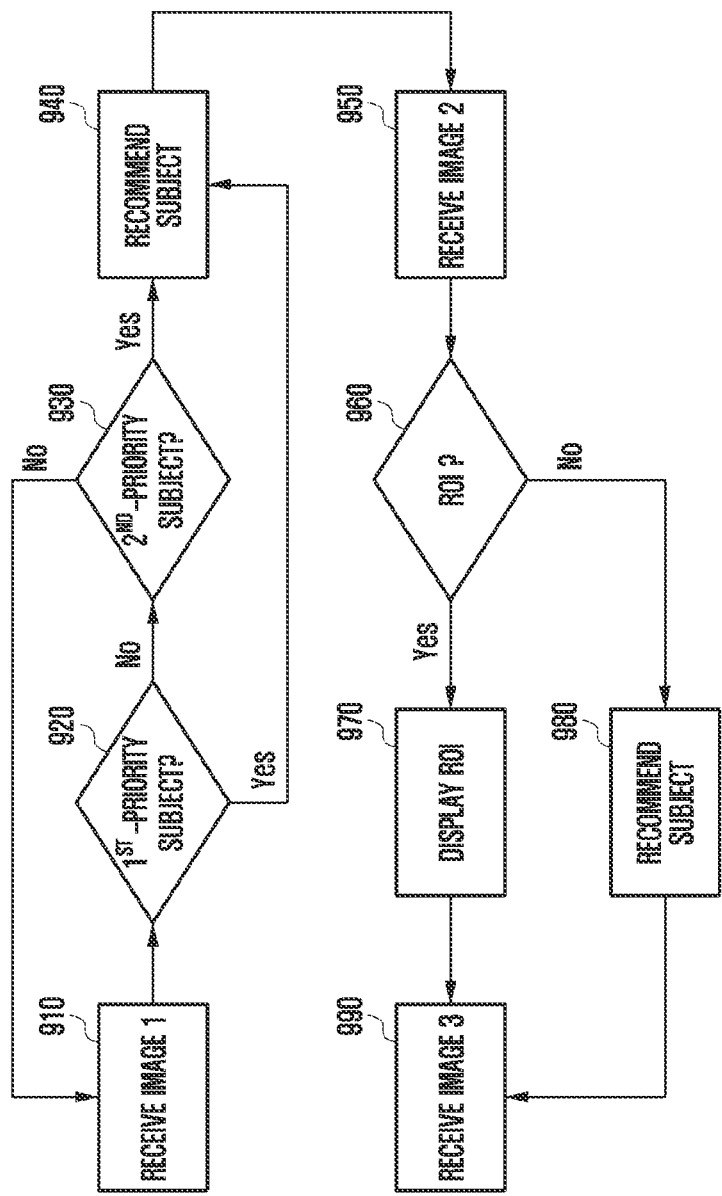

ELECTRONIC DEVICE COMPRISING MULTI-CAMERA, AND PHOTOGRAPHING METHOD

CROSS-REFERENCE TO RELATED APPLICATION

This application is a continuation of U.S. application Ser. No. 17/967,847, filed on Oct. 17, 2022, and International Application No. PCT/KR2021/003772, designating the United States, filed on Mar. 26, 2021, in the Korean Intellectual Property Receiving Office and claiming priority to Korean Patent Application No. 10-2020-0046765, filed on Apr. 17, 2020, in the Korean Intellectual Property Office, the disclosures of which are incorporated by reference herein in their entireties.

TECHNICAL FIELD

Various embodiments of the disclosure relate to an electronic device with a multi-camera and a photographing method.

BACKGROUND ART

As the performance of a camera equipped in an electronic device (e.g., a smartphone) develops, more and more users are taking pictures with the camera of the electronic device in addition to taking pictures using a separate camera.

The electronic device may include a plurality of cameras, thereby enabling photographing through various angles of view.

Recently, thanks to the development of processors, attempts are made to utilize photographing techniques using artificial intelligence (AI) and machine learning. Through these techniques, methods for identifying a plurality of subjects in an image being photographed and focusing on the identified subjects are being developed.

Technical Problem

Because the electronic device may include multiple cameras, various angles of view may be provided to the user. To photograph a subject, the user may move the electronic device left and right or up and down to position the subject for photographing.

Due to the movement of the electronic device, the focus of the camera toward the subject may be deflected or an unwanted subject may be inadvertency focused by the electronic device when taking a picture.

Solution to Problem

Various embodiments of the disclosure are intended to provide a method of identifying a subject, which is a priority shooting target, while reducing user movement by using various angles of view of a plurality of cameras equipped in an electronic device, and performing photographing while tracking a shooting area of the identified subject.

According to various embodiments of the disclosure, an electronic device includes a multi-camera, a display, a memory, and a processor operatively connected to the camera, the display, and the memory. The processor may be configured to receive a first image being photographed at a first angle of view of the camera, to receive a second image being photographed at a second angle of view of the camera, to identify a subject in the first image in accordance with a predetermined criterion, to generate a third image in which the identified subject is cropped depending on a predetermined region of interest (ROI), and to display, while displaying the first image on the display, the second image and the third image on at least a portion of an area in which the first image is displayed.

According to various embodiments of the disclosure, a photographing method using a multi-camera of an electronic device may include receiving a first image being photographed at a first angle of view of the multi-camera and a second image being photographed at a second angle of view of the multi-camera, identifying a subject in the first image in accordance with a predetermined criterion, generating a third image in which the identified subject is cropped depending on a predetermined ROI, and displaying, while displaying the first image on the display, the second image and the third image on at least a portion of an area in which the first image is displayed.

Advantageous Effects of Invention

According to various embodiments of the disclosure, the electronic device enables a user to track and photograph a desired subject within a camera angle of view regardless of a movement of the subject.

In addition, the electronic device can display a preview screen of an identified and tracked subject on a part of an image being photographed or display a photographed image of another angle of view, thereby providing a shooting experience centered on various angles of view of the subject.

BRIEF DESCRIPTION OF DRAWINGS

FIG. 9 is a flowchart illustrating a process of changing a subject based on a predetermined criterion of a photographing method according to various embodiments of the disclosure.

MODE FOR THE INVENTION

Figure 1:
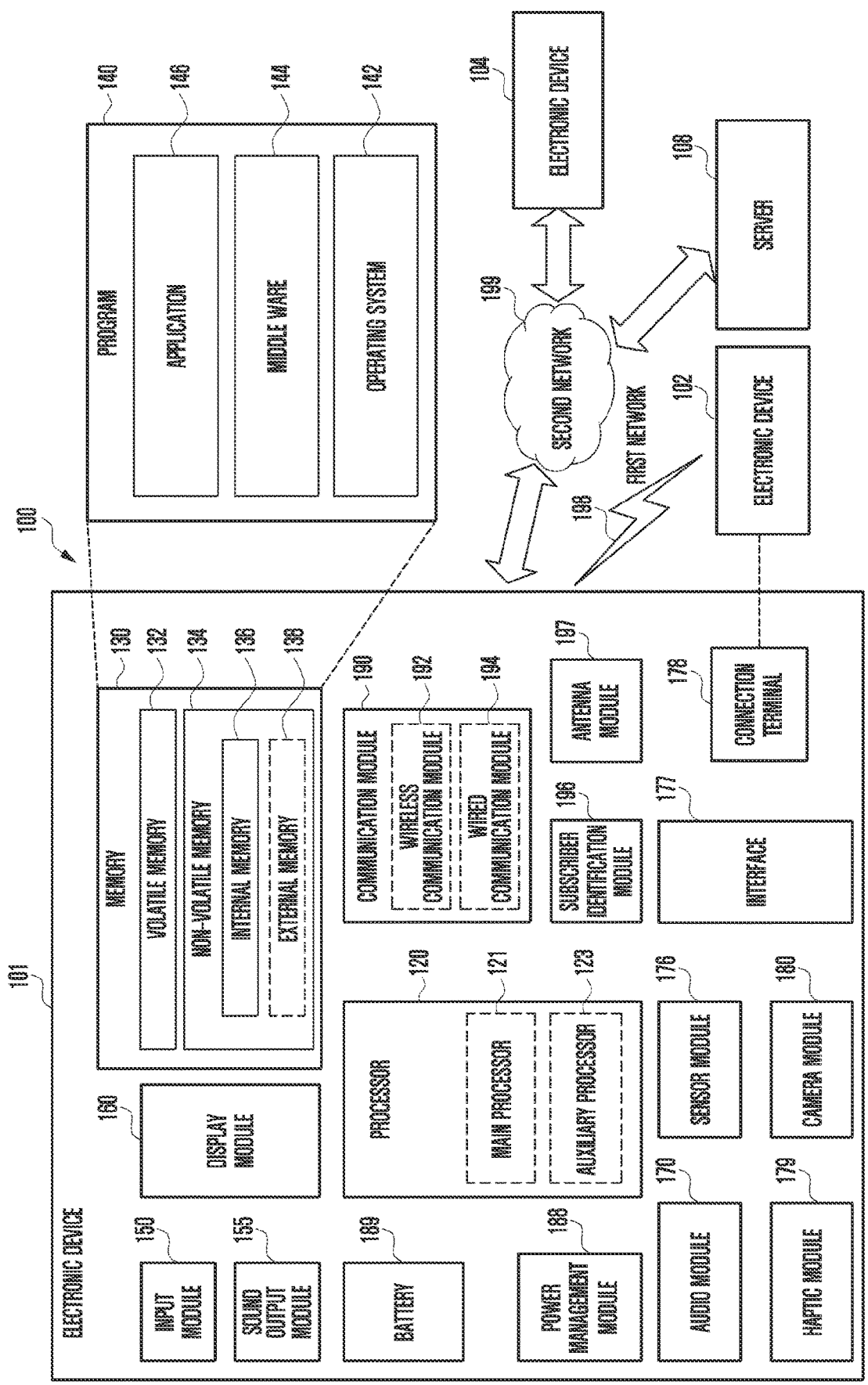
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, in instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
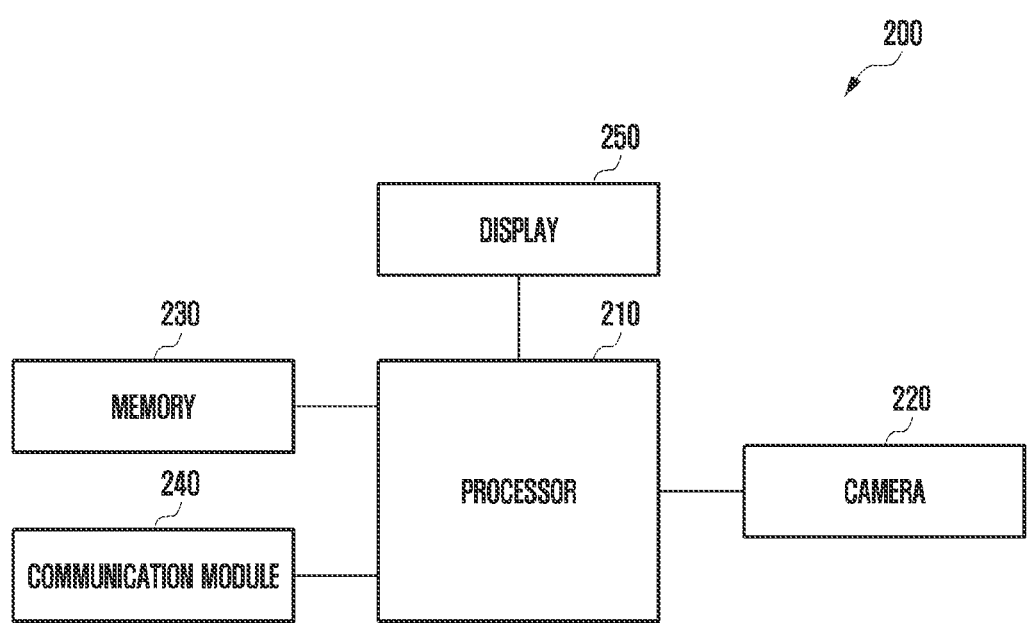
FIG. 2 is a block diagram illustrating an electronic device according to various embodiments of the disclosure.

FIG. 2 is a block diagram illustrating an electronic device according to various embodiments of the disclosure.

With reference to FIG. 2, the electronic device 200 (e.g., the electronic device 101 in FIG. 1) may include a processor 210 (e.g., the processor 120 in FIG. 1), a camera 220 (e.g., the camera module 180 in FIG. 1), a memory 230 (e.g., the memory 130 in FIG. 1), a communication module 240 (e.g., the communication module 190 in FIG. 1), and a display 250 (e.g., the display device 160 in FIG. 1), and may include at least a part of the structure and/or function of the electronic device 101 in FIG. 1. Components of the electronic device shown in FIG. 2 may be omitted or replaced with other components, and are not considered as a limitation.

According to various embodiments, the processor 210 is a component capable of performing an operation or data processing related to control and/or communication of respective components of the electronic device 200, and may include at least a part of configuration and/or function of the processor 120 in FIG. 1. The processor 210 may be functionally, operatively, and/or electrically connected to internal components of the electronic device including the camera 220, the memory 230, the communication module 240, and the display 250.

According to various embodiments, the processor 210 may be configured to process an image signal (e.g., receive an image) being photographed using the camera (e.g., the camera module 180 in FIG. 1) and display it on the display 250. For example, the processor 210 may simultaneously display, on the display 250, a first image, a second image, an n-th image, etc. respectively photographed by a first camera, a second camera, an n-th camera, etc. that can be included in the camera 220. In the case that the first image becomes a main photographed image and is displayed while occupying most of the area of the display 250, the processor 210 may display the second image, the n-th image, etc., except for the first image, as preview images overlaid on at least a partial area of the display.

According to another embodiment, the processor 210 may identify a plurality of subjects in the first image photographed by the first camera, based on a predetermined criterion. For example, the processor 210 may be implemented with an AI processor or a processor capable of machine learning, and may be configured to identify a subject by distinguishing an object from a background in the first image received from an image sensor. The subject may be a target that the user of the electronic device 200 wants to photograph when shooting. In case of the AI processor or the processor capable of machine learning, it may be connected to a database of big data or cloud and receive updated information regarding the subject (or regarding subject identification). The processor 210 may generate a third image in which a predetermined region of interest (ROI) of an object (e.g., a person, an animal, a thing, etc.) identified from the first image is cropped. For example, the third image may be one cropping a predetermined ROI (e.g., a face) of a subject (e.g., a person) identified from the first image. The processor 210 may display the third image as a preview image by overlaying it on at least a partial area of the display where the first image is displayed.

According to various embodiments, the camera 220 may include a lens assembly, a flash, an image sensor, an image stabilizer, a memory (e.g., a buffer memory), or an image signal processor. The lens assembly may include one or more lenses, and each lens assembly may be referred to as a separate camera. In this case, the camera 220 may form a dual camera or a multi-camera. Some of a plurality of lens assemblies may have the same lens properties (e.g., angle of view, focal length, auto focus, f number, or optical zoom), or at least one lens assembly may have one or more lens properties different from those of other lens assemblies. The lens assembly may include, for example, a wide-angle lens or a telephoto lens. The camera 220 may include at least a part of the structure and/or function of the camera module 180 in FIG. 1.

With reference to FIG. 2, a plurality of lens assemblies that may be included as components of the camera 220 may be interchangeably referred to as a plurality of cameras. The plurality of cameras may have different angles of view for each individual camera, and may be disposed on the front and/or rear of the electronic device. The camera may include the image sensor having a device (e.g., a complementary metal-oxide-semiconductor (CMOS), a charge-coupled device (CCD), etc.) that converts light into an electrical signal. The camera may photograph an image at various angles of view (or fields of view, view angles, etc.), and the n-th angle of view may be understood as the range of an image photographed by the n-th camera. For example, the fact that the first angle of view is wider than the second angle of view may mean that the photographing range of the first camera is wider than the photographing range of the second camera.

According to another embodiment, the angle of view of the camera may be changed by adjusting the range of light incident on the image sensor, changed by an input for changing the photographing camera from the first camera to the second camera, or changed by cropping the image being photographed. For example, in case of cropping a received image, an image having a narrower angle of view may be obtained by cutting a part of the original image. Such a change in the angle of view may cause a change in resolution, and throughout this specification, a change in resolution by cropping may be described interchangeably with a change in the angle of view (e.g., a change in the camera).

According to various embodiments, the memory 230 may include at least a part of the structure and/or function of the memory 130 in FIG. 1.

According to various embodiments, the communication module 240 may include at least a part of the structure and/or function of the communication module 190 in FIG. 1. The communication module 240 may transmit, to an external device (e.g., a server, a cloud database, etc.), a result of accumulating experiences identified by the processor 210 through an algorithm for identifying a subject to be photographed. In addition, the processor 210 may receive the accumulated result from the external device through the communication module 240 and utilize it to more easily identify the subject.

According to various embodiments, the display 250 may include at least a part of the structure and/or function of the display device 160 in FIG. 1. For example, the display 250 may display the first image, the second image, the third image, the n-th image, etc. received from the image sensor.

FIGS. 3A, 3B, 3C, and 3D are exemplary views illustrating photographing using an electronic device according to various embodiments of the disclosure.

Figure 3A:
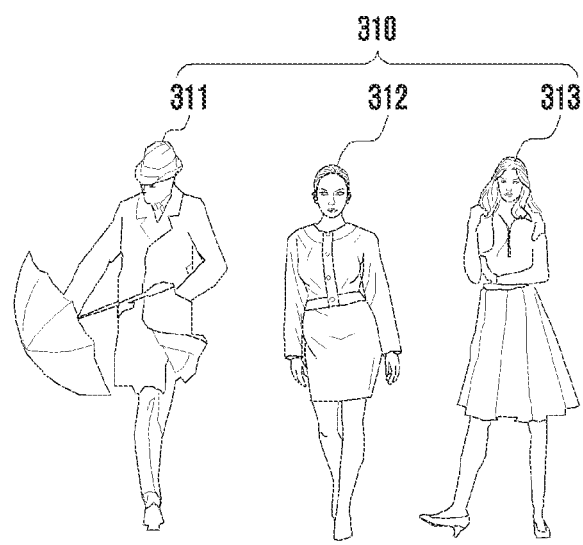
FIGS. 3A, 3B, 3C, and 3D are exemplary views illustrating photographing techniques using an electronic device according to various embodiments of the disclosure.
Figure 3B:
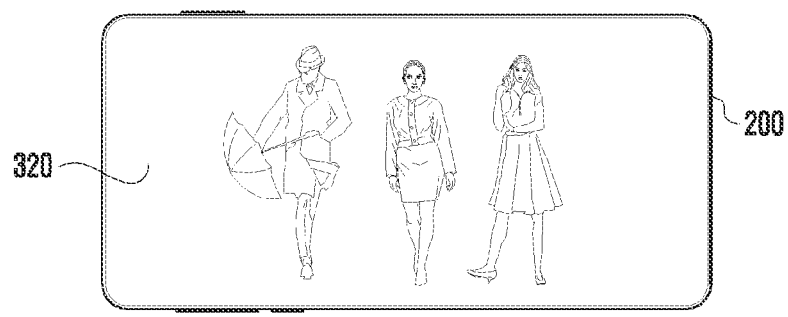

With reference to FIGS. 3A and 3B, upon photographing using the camera (e.g., the camera module 180 in FIG. 1, the camera 220 in FIG. 2) of the electronic device 200 (e.g., the electronic device 101 in FIG. 1), a subject 310 is displayed on the display of the electronic device 200 corresponding to the angle of view of the camera. There may be at least one subject 310, and the subject 310 can include a plurality of subjects (e.g., subjects 311, 312, and 313).

Figure 3C:
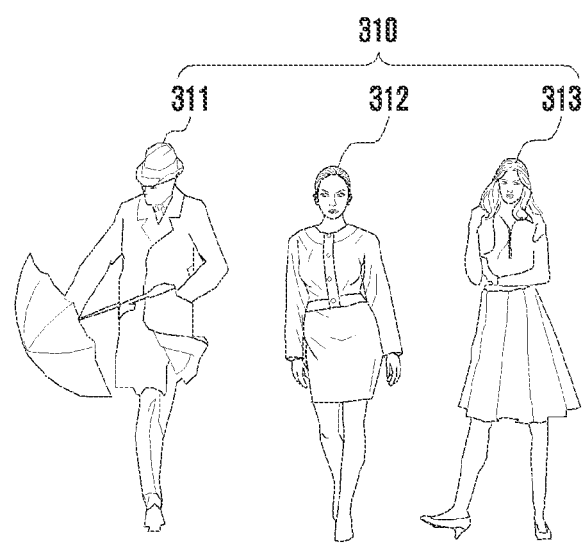
Figure 3D:
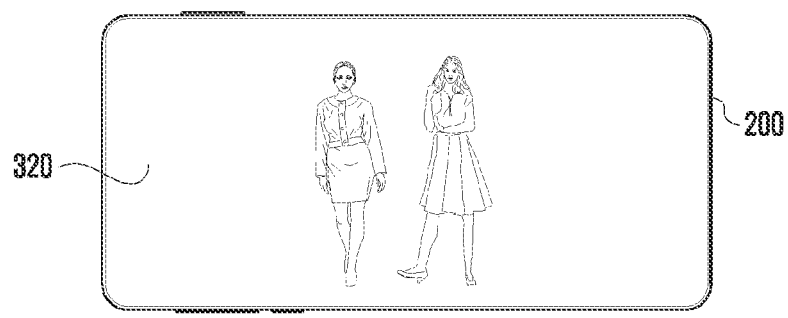

With reference to FIGS. 3B and 3D, a user carrying the electronic device 200 may not perform an action (e.g., panning, tilting, etc.) of moving the electronic device along the subject 310 in a stationary state. With reference to FIGS. 3A and 3B, in an image 320 (also referred to as a preview area) being photographed by the user through the camera of the electronic device 200, the entire subject 310 is displayed. With reference to FIGS. 3C and 3D, in some embodiments, when the subject 310 is moved and partially out of the camera angle of view of the electronic device 200 of, for example, a user who stands still and performs the respective photographing, only some subjects 312 and 313 may be photographed and displayed.

Figure 4:
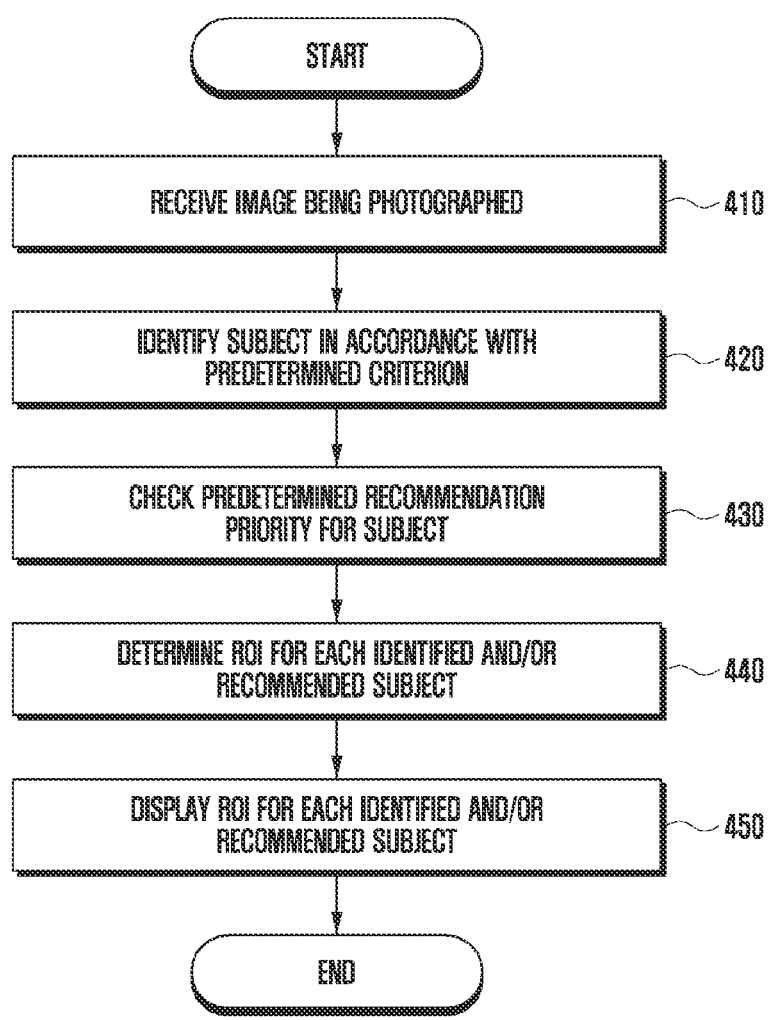
FIG. 4 is a flowchart illustrating a photographing method according to various embodiments of the disclosure.

FIG. 4 is a flowchart illustrating a photographing method according to various embodiments of the disclosure. In the following embodiments, respective operations may be performed sequentially, but are not necessarily performed sequentially. For example, the order of respective operations may be changed, and at least two or more operations may be performed in parallel.

With reference to FIG. 4, at operation 410, the processor of the electronic device (e.g., the electronic device 101 in FIG. 1, the electronic device 200 in FIG. 2) may receive an image photographed by the camera. For example, the processor (e.g., the processor 120 in FIG. 1, the processor 210 in FIG. 2) may simultaneously receive a plurality of images photographed using a plurality of cameras of the electronic device.

According to various embodiments, the processor may receive an image being photographed from the camera (e.g., the camera module 180 in FIG. 1, the camera 220 in FIG. 2) or the image sensor included in the camera. The image being photographed may be image-signal-processed and displayed on the display (e.g., the display device 160 in FIG. 1, the display 250 in FIG. 2). The processor may receive information of n images that may be photographed by n cameras that may be included in the electronic device. An image being photographed at the first angle of view of the first camera may be referred to as the first image, an image being photographed at the second angle of view of the second camera may be referred to as the second image, and an image being photographed at the n-th angle of view of the n-th camera may be referred to as the n-th image. In addition, frame-by-frame images received by the processor may be referred to as image 1, image 2, image n, and the like in the order of time received. In this example, the increasing order of numbers is not limited to necessarily corresponding to the time order, and may be configured in the reverse order or may correspond in any order.

According to an embodiment, the processor may be configured to, while displaying the first image being photographed by the first camera on a main photographing screen (e.g., the image 320 of the image photographing user interface (UI) in FIG. 3), display together the first image being photographed by the first camera, the second image being photographed by the second camera, the third image being photographed by the third camera, or a cropped image of a subject in the first image on a partial area of the main photographing screen. According to another embodiment, the processor may be configured to display the first image being photographed by the first camera on the main image photographing screen when starting the image photographing using a camera application.

With reference to FIG. 4, at operation 420, the processor may identify a subject from the received image in accordance with a predetermined criterion. The predetermined criterion may relate to, for example, the types of subjects. The types of subjects may be classified into a person, an animal, a thing, and the like. According to another embodiment, the predetermined criterion may include a recommendation priority of the identified subject. For example, the subject priority may be predetermined in the order of a person, an animal, a thing among the identified subjects, and it may be configured to preferentially recommend a subject with a large accumulation of photographed experience through an AI processor or a processor capable of machine learning. According to another embodiment, the predetermined criterion may include an ROI for each subject identified and/or recommended. The ROI may relate to a partial region (e.g., a face or a body) of the subject (e.g., a person).

In identifying the subject, the processor may identify the subject from the received image, based on AI. For example, in case of being implemented with the AI processor or the processor capable of machine learning, the processor may be configured to identify and recommend a subject and analyze a plurality of ROIs to classify a category. Also, in relation to subject identification through the AI-based or machine learning-based processor, it is possible to learn the user's photographing experience and update the predetermined criterion for subject identification by utilizing data accumulated from an external device. According to another embodiment, the predetermined criterion for subject identification may be stored in the memory (e.g., the memory 130 in FIG. 1, the memory 230 in FIG. 2) of the electronic device and provided when the electronic device is initially sold. According to still another embodiment, the predetermined criterion may be updated or provided through a port (e.g., a USB port, etc.) allowing an external connection of the electronic device, which is not limited to a specific scheme.

The processor may receive an image from the camera of the electronic device, and identify a subject (e.g., a person, an animal, a thing, etc.) based on the received image. According to an embodiment, the processor may be configured to detect a subject through AI-based processing on the received image. For example, the processor may include a function block (e.g., an object detection function block, etc.) for detecting a subject by learning data accumulated based on AI and/or data inputted from an external server or the like.

At operation 430, the processor may be configured to check a predetermined recommendation priority for the identified subject. The predetermined criterion for subject identification may include a priority for recommending the identified subject. For example, the priority of subject recommendation may be configured to recommend a person as a first priority subject, an animal as a second priority subject, and a thing as a third priority subject among the identified subjects.

With reference to FIG. 4, at operation 440, the processor may be configured to determine an ROI for each identified and/or recommended subject. According to an embodiment, the processor may be configured to determine an ROI (e.g., a main part to be photographed) according to an individual subject with respect to an identified and/or recommended subject existing in the received image. For example, the processor may identify and recommend a first subject (e.g., person 1) and a second subject (e.g., person 2) within the received image, and determine a specific region (e.g., a face) of the subjects as an ROI in accordance with a predetermined criterion for ROI.

With reference to FIG. 4, at operation 450, the processor may be configured to display the ROI for each identified and/or recommended subject in the corresponding image. According to an embodiment, the processor may be configured to display an identifier on the ROI for each subject to give priority. For example, the identifier displayed on the subject may be implemented as a bounding box, and may be displayed with different colors depending on priorities.

The processor may be configured to determine the position and/or size of the detected object in the received image in addition to AI-based object detection (e.g., subject detection). The processor may include an AI-based function block (e.g., a subject type determination function block) that crops an image of the detected and/or determined subject and determines the type of the subject of the cropped image. For example, the processor may be configured to determine the position and/or size of the subject in the received image, based on AI, and determine the subject type (e.g., a person, an animal, a thing, etc.), based on the cropped image of a partial area of the subject.

The detection of the subject, the determination of the position and/or size of the detected subject in the image, and the determination of the subject type based on the cropped image of the detected subject through the processor of the electronic device may not be sequentially performed. For example, the processor may be configured to identify a subject based on AI, recommend the identified subject in accordance with a predetermined recommendation priority, and display an identifier emphasizing a region of interest for the recommended subject. Here, identifying the subject by the AI processor may be detecting an object based on AI in accordance with a predetermined criterion and determining the position and/or size of the detected object in the received image. Also, displaying the identifier for emphasizing the region of interest for the recommended subject by the AI processor may correspond to cropping the subject part of the image and determining its type by the subject type determination function block.

According to various embodiments, the processor may receive a plurality of images being photographed using a plurality of cameras, and may display an ROI for each subject identified and/or recommended. Also, in case that the identified subject disappears from an image (e.g., image 320 in FIG. 3) displayed on the main photographing screen or a new subject is included in the image displayed on the main photographing screen through camera calibration (extrinsic calibration) with respect to the entire angle of view of the camera of the electronic device, the processor may repeatedly perform the operations 420 to 450.

Figure 5:
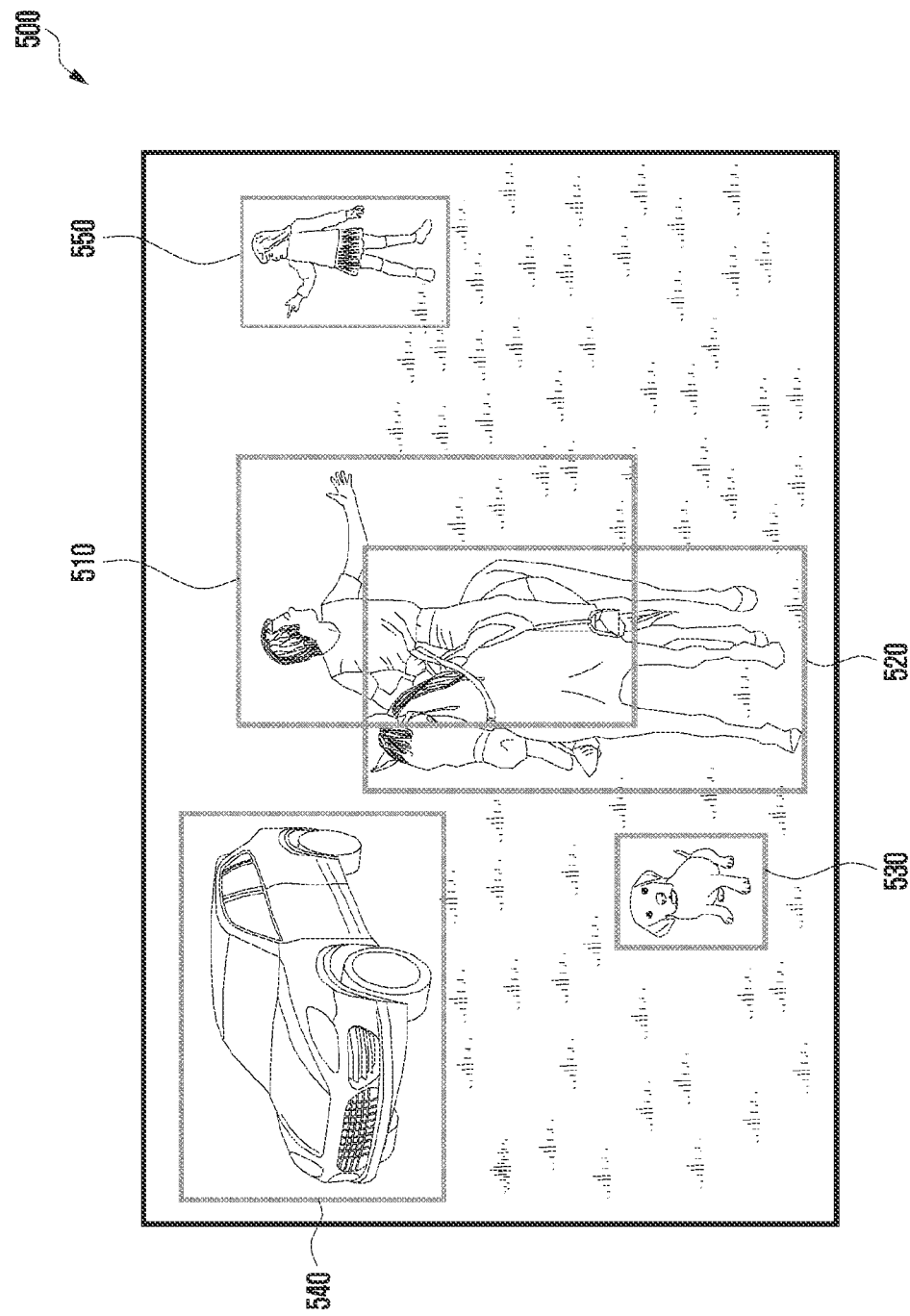
FIG. 5 is an exemplary view illustrating subject identification in photographing using an electronic device according to various embodiments of the disclosure.

FIG. 5 is an exemplary view illustrating subject identification in photographing using an electronic device according to various embodiments of the disclosure.

The image shown in FIG. 5 may be one photographed by one of a plurality of cameras of an electronic device (e.g., the electronic device 101 in FIG. 1, the electronic device 200 in FIG. 2). For example, the image shown in FIG. 5 may be an image 500 received on a main photographing screen (e.g., image 320 in FIG. 3) when the user of the electronic device performs photographing. A processor (e.g., the processor 120 in FIG. 1, the processor 210 in FIG. 2) may receive an image from an image sensor of a camera (e.g., the camera module 180 in FIG. 1, the camera 220 in FIG. 2), perform image processing, and identify a subject in accordance with to a predetermined criterion.

With reference to FIG. 5, the processor may identify subjects as persons 510 and 550, animals (e.g., horse 520 and dog 530), and a thing (e.g., car 540) in the received image in accordance with to the predetermined criterion. For example, the processor may be equipped in the electronic device in the form of the AI processor or being capable of machine learning, and an algorithm related to the subject identification operation may be updated through a communication module (e.g., the communication module 190 in FIG. 1, the communication module 240 in FIG. 2) from an external device.

According to an embodiment, the processor may identify and recommend a person as a first priority subject, an animal as a second priority subject, and a thing as a third priority subject in accordance with a predetermined criterion. According to another embodiment, depending on a predetermined criterion, the processor may recommend a subject identified at a location close to the electronic device on calibrated coordinates as a priority photographing target. With reference FIG. 5, the subject may be recommended by priority in the order of a horse 520, a person 510 riding the horse 520, a dog 530, a car 540, and a distant person 550.

Camera calibration may refer to integrating a coordinate system of the camera of the electronic device. For example, such as a first coordinate system consisting of x, y, and z axes with the lens center of the first camera of the electronic device as the origin, and a second coordinate system consisting of x, y, and z axes with the lens center of the second camera as the origin, there may be coordinate systems according to individual cameras. In addition, an error may occur in an image to be photographed using the camera of the electronic device due to an internal mechanical structure of the camera (or camera module), such as a lens used, a distance and an angle between the lens and the image sensor, and the like. An image to be photographed using the camera of the electronic device may be obtained by projecting points in a three-dimensional space onto a two-dimensional image (e.g., a plane). Therefore, the process of constructing the integrated coordinate system of the image to determine the position of the external coordinate system in which the subject is present and to adjust the structural error inside the camera may be collectively referred to as camera calibration. Parameters necessary for performing such camera calibration for forming the integrated coordinate system may be preconfigured or may be variously configured depending on the types and specifications of a plurality of cameras provided in the electronic device.

The parameters necessary for performing the camera calibration may include, for example, camera intrinsic parameters and camera extrinsic parameters. According to an embodiment, the camera intrinsic parameters may include a focal length, a principal point, a skew coefficient, and the like. According to another embodiment, the camera extrinsic parameters may vary depending on a mounting structure of the camera or the setting of an external coordinate system.

According to various embodiments, the processor may be configured to perform camera calibration and thereby form an integrated coordinate system of a plurality of cameras of the electronic device. Therefore, the processor may determine the photographing range according to the angle of view of each individual camera. In case that the subject to be photographed is located at the boundary of the determined photographing range, the processor may change the camera performing photographing and control the subject to be located within the photographing range.

According to various embodiments, a predetermined criterion for a priority for identifying or recommending a subject from a received image by the processor or a predetermined region of interest of the identified subject may be stored or updated in various ways and is not limited to examples set forth herein.

The processor may be an AI processor and/or a processor capable of machine learning. A method for the processor to detect a subject is not limited to a specific one and may be performed variously. The processor may receive an image from the camera of the electronic device and identify a subject (e.g., a person, an animal, a thing, etc.) based on the received image. According to an embodiment, the processor may be configured to detect a subject through AI-based processing on the received image. For example, the processor may include a function block (e.g., an object detection function block, etc.) for detecting a subject by learning data accumulated based on AI and/or data inputted from an external server or the like.

The processor may be configured to determine the position and/or size of the detected object in the received image in addition to AI-based object detection (e.g., subject detection). The processor may include an AI-based function block (e.g., a subject type determination function block) that crops an image of the detected and/or determined subject and determines the type of the subject of the cropped image. For example, the processor may be configured to determine the position and/or size of the subject in the received image, based on AI, and determine the subject type (e.g., a person, an animal, a thing, etc.), based on the cropped image of a partial area of the subject.

The detection of the subject, the determination of the position and/or size of the detected subject in the image, and the determination of the subject type based on the cropped image of the detected subject through the processor of the electronic device may not be sequentially performed. For example, the processor may be configured to identify a subject based on AI, recommend the identified subject in accordance with a predetermined recommendation priority, and display an identifier emphasizing a region of interest for the recommended subject. Here, identifying the subject by the AI processor may be detecting an object based on AI in accordance with a predetermined criterion and determining the position and/or size of the detected object in the received image. Also, displaying the identifier for emphasizing the region of interest for the recommended subject by the AI processor may correspond to cropping the subject part of the image and determining its type by the subject type determination function block.

Figure 6:
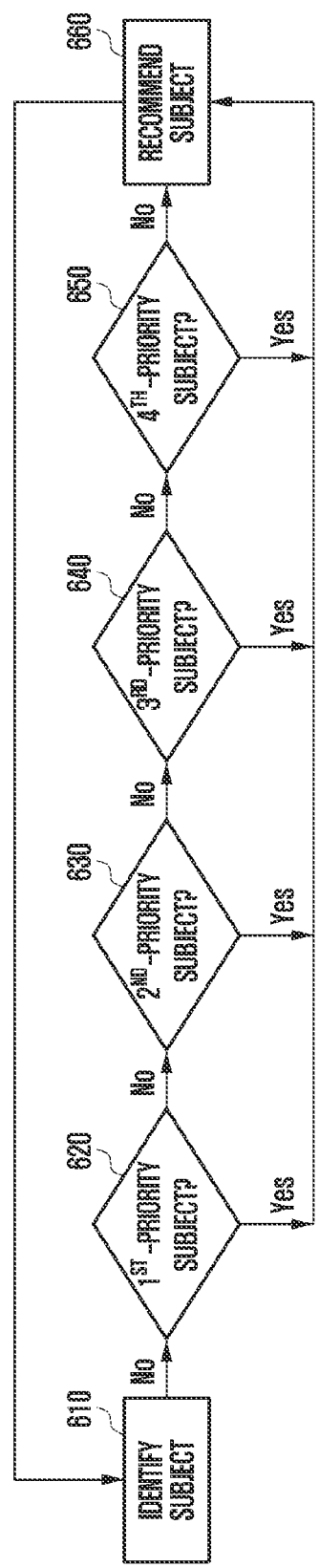
FIG. 6 is a flowchart illustrating a subject identification and/or recommendation process based on a predetermined criterion according to various embodiments of the disclosure.

FIG. 6 is a flowchart illustrating a subject identification and/or recommendation process based on a predetermined criterion according to various embodiments of the disclosure. The expression such as a received image, a previously received image, or the like used herein may refer to a frame-by-frame image received by the processor when photographing is performed using the camera of the electronic device (e.g., the electronic device 101 in FIG. 1, the electronic device 200 in FIG. 2) according to various embodiments. For example, the image (e.g., image 2) received by the processor of the electronic device and the previously received image (e.g., image 1) may be images having a difference of one frame.

With reference to FIG. 6, the processor (e.g., the processor 120 in FIG. 1, the processor 210 in FIG. 2) may identify and/or recommend a subject through operations 610 to 660 in accordance with a predetermined criterion. For example, the processor may identify all subjects in the received image in accordance with the predetermined criterion. With reference to FIG. 5, at operation 610, the processor may identify subjects (e.g., persons 510 to 550) in the received image 500.

According to various embodiments, at the processor, a process of identifying the subject and a process of recommending the subject may be simultaneously performed. For example, the processor may be configured to, while identifying the subject in accordance with the predetermined criterion, recommend the subject among the identified subjects in accordance with the predetermined recommendation priority. According to an embodiment, the processor may be configured to identify the subject in accordance with the predetermined criterion at operation 610 and recommend the identified subject in accordance with the predetermined recommendation priority at operation 660.

With reference to FIG. 6, the processor may be configured to recommend from the first priority subject to the n-th priority subject among the identified subjects in accordance with the predetermined criterion at operations 620 to 650. For example, the processor may recommend the identified subject in accordance with the predetermined subject recommendation priority. The predetermined recommendation priority may be included in the predetermined criterion that is a criterion for subject identification. According to another embodiment, the subject recommendation priority may be based on the type of the subject (e.g., a person, an animal, a thing), the location of the subject (e.g., the distance between the electronic device and the subject), and the number of subjects (e.g., multiple subjects in the received image).

With reference to FIGS. 5 and 6, the processor may identify the subjects (e.g., persons 510 to 550) in the received image in accordance with the predetermined criterion, and determine the n-th priority subject among the identified subjects (e.g., persons 510 to 550) in accordance with the predetermined recommendation priority. According to an embodiment, in the case that the recommendation priority is configured according to subject types, the processor may recommend the persons 510 and 550 as the first priority, the animals (e.g., horse 520 and dog 530) as the second priority, and the thing (e.g., car 540) as the third priority. According to another embodiment, in case that the recommendation priority is configured according to subject locations, the processor may recommend the subjects by priority in the order of the horse 520, the person 510 riding the horse, the dog 530, the car 540, and the distant person 550.

According to an embodiment, the processor may be configured to identify and/or recommend a subject for each received frame-by-frame image. For example, the processor may identify subjects existing in the received image, and make a recommendation among the identified subjects in accordance with a user's priority. According to another embodiment, the processor may change the recommended subject based on an input by a user's selection or the like while photographing the identified and recommended subject. For example, the processor may be configured to perform the operations 610 to 660 to photograph a selected subject based on a selection input of a user who wants to photograph a subject other than the identified and/or recommended subject within the image.

With reference to FIG. 6, at operation 660, the processor may recommend a subject among the identified subjects in accordance with the predetermined recommendation priority. For example, the processor may be configured to receive the image being photographed, determine the disappearance of the subject or the appearance of a new subject in the image, and repeatedly perform the operations 610 to 660.

Figure 7:
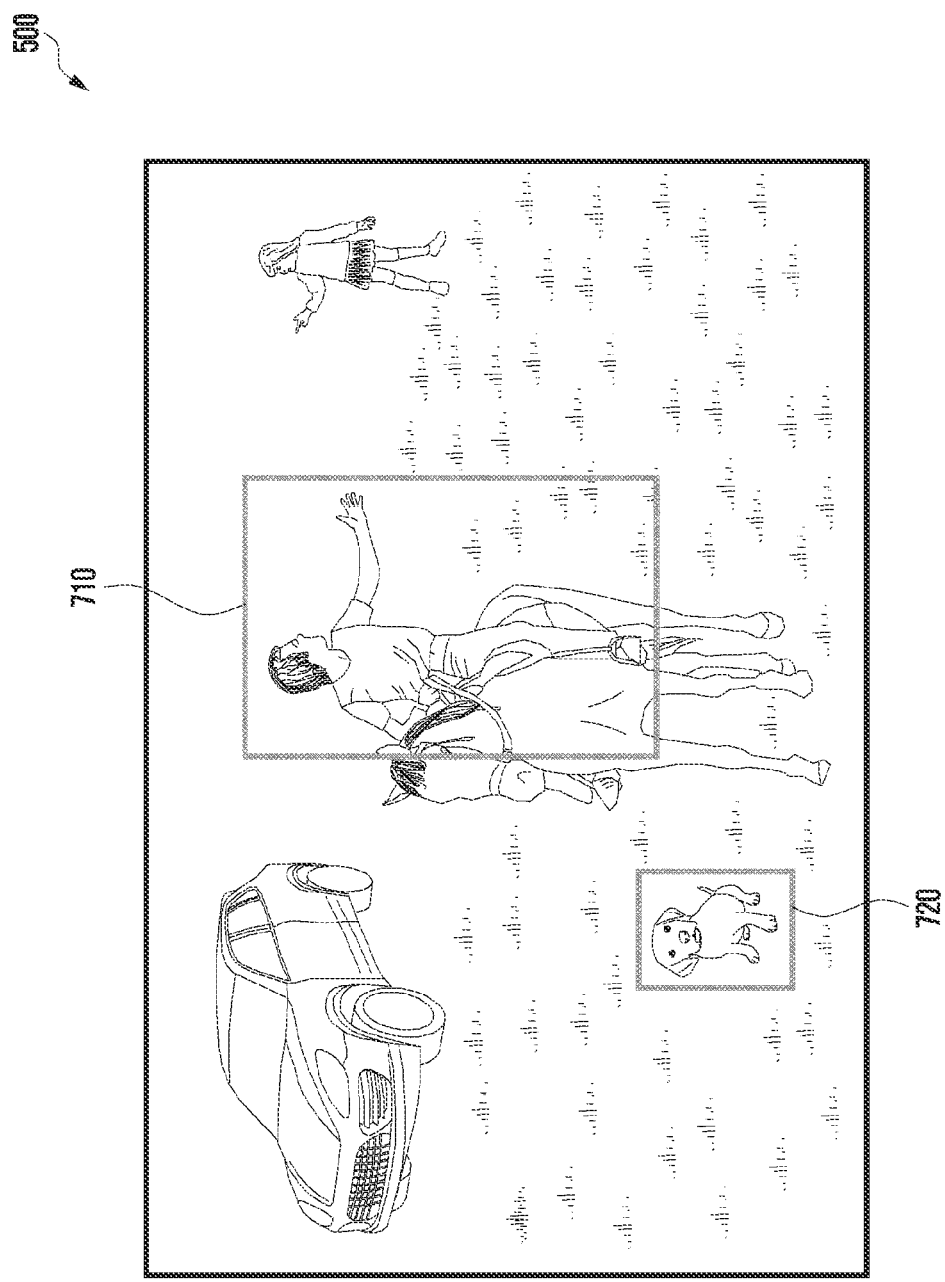
FIG. 7 is an exemplary view illustrating subject identification and/or recommendation based on a predetermined criterion according to various embodiments of the disclosure.

FIG. 7 is an exemplary view illustrating subject identification and/or recommendation based on a predetermined criterion according to various embodiments of the disclosure.

With reference to FIGS. 5 to 7, the processor may recommend a person 710 riding the horse, and a dog 720 among the identified subjects (e.g., persons 510 and 550, horse 520, dog 530, and car 540 in FIG. 5) in accordance with the predetermined recommendation priority. For example, the processor may indicate a first identifier as a red bounding box when the person 710 on horseback is the first priority recommended subject, and indicate a second identifier as a blue bounding box when the dog 720 is the second priority recommended subject. Such identifier indications may be displayed on the display of the electronic device. According to another embodiment, unlike the image shown in FIG. 7, identifier indications for the ROI for each subject may be displayed on the display. For example, the first identifier indication may be displayed on the face of the person 710 on horseback, and the second identifier indication may be displayed on the head of the dog 720.

With reference to FIGS. 5 to 7, the predetermined criterion for identifying a subject and the recommendation priority of the identified subject may be applied together. In addition, because the subject identification and the recommendation priority may act in combination, the processor may identify and/or recommend only the person 710 on horseback and the dog 720 in the received image 500 and determine them as the subjects being tracked. For example, while recommending a person as the first priority subject and an animal as the second priority subject among the identified subjects, the processor may also apply a criterion for recommending a frequently photographed animal (e.g., a dog, a cat) as another recommendation priority. In this case, as shown in FIG. 7, the processor may determine the person 710 on horseback and the dog 720 as the recommended priority among the identified subjects and thereby display the identifier.

With reference to FIG. 7, the illustrated identifier indication is not limited to the bounding box and may be displayed by a color, a shape of a bounding, etc. in various ways.

Figure 8:
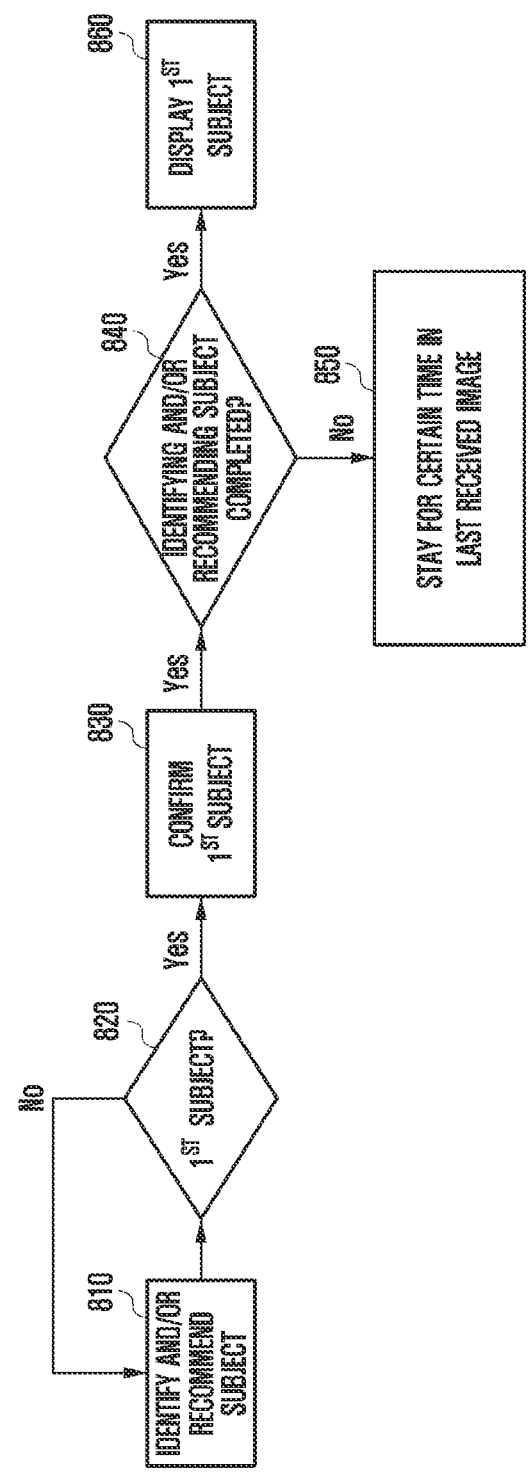
FIG. 8 is a flowchart illustrating subject identification and/or tracking based on a predetermined criterion according to various embodiments of the disclosure.

FIG. 8 is a flowchart illustrating subject identification and/or tracking based on a predetermined criterion according to various embodiments of the disclosure.

According to various embodiments, the processor (e.g., the processor 120 in FIG. 1, the processor 210 in FIG. 2) may be configured to assign an identifier to an ROI for each subject in accordance with a predetermined recommendation priority after identifying the subject. A predetermined criterion may exist for the ROI for each subject. For example, in case that the subject is a person, the ROI may be configured in the order of a face, a body, and the like.

With reference to FIG. 8, the processor may be configured to repeatedly perform operations 810 to 860 for each image of continuously received images. According to an embodiment, the processor may be configured to re-identify and/or re-recommend the identified and/or recommended subject within the entire camera angle of view of the electronic device (e.g., the electronic device 101 in FIG. 1, the electronic device 200 in FIG. 2) from the received image. According to another embodiment, the processor may be configured to re-display the displayed ROI for each identified and/or recommended subject.

With reference to FIG. 8, the processor may be configured to identify and/or recommend a subject from a received image (e.g., image 2) at operation 810 and compare it with a subject identified and/or recommended in the previously received image (e.g., image 1). For example, the processor may be configured to compare at operation 820 whether the identified and/or recommended subject in the received image (e.g., image 2) and the identified and/or recommended subject in the previously received image (e.g., image 1) are the same subject.

With reference to FIG. 8, the processor may be configured to return to the operation 810 in case that the first subject of the received image (e.g., image 2) is different from the first subject of the previously received image.

With reference to FIG. 8, the processor may be configured to perform operation 830 of confirming the identity of the previously identified first subject in case that the first subject of the received image (e.g., image 2) is identical with the first subject of the previously received image.

With reference to FIG. 8, the processor may be configured to perform operation 840 of determining whether identification and/or recommendation of the first subject is completed. For example, the processor may be configured to display the identifier on the ROI of the first subject at operation 860 in the case that the identification and/or recommendation of the first subject is completed.

With reference to FIG. 8, the processor may be configured to perform operation 850 of staying for a certain time for re-identification and/or re-recommendation of the first subject in the last received image (e.g., image 2) in the case that the identification and/or recommendation of the first subject is not completed at the operation 840. For example, the processor may be configured to perform the operations 810 to 840 and 860 in the image 2 for a certain time (e.g., 1.5 seconds) in case that the first subject that existed in the previously received image (e.g., image 1) is not identified and/or recommended in the received image (e.g., image 2). The reason that the processor is configured to go through such a process is because, for example, there may be a case where the first subject moves and deviates from the entire angle of view (e.g., the calibrated coordinate system) of the electronic device for a while and then comes back. If the previously identified and recommended subject is continuously re-identified and/or re-recommended, the load on the processor can be substantially. Advantageously, delaying for a certain time (e.g., 1.5 seconds) before re-identification and/or re-recommendation may reduce the processor load.

FIG. 9 is a flowchart illustrating a process of changing a subject based on a predetermined criterion of a photographing method according to various embodiments of the disclosure.

According to various embodiments, the processor may be configured to receive images being photographed frame by frame using a plurality of cameras. For example, the processor may be configured to receive frames of image 1, image 2, image 3, image n, etc. in chronological order.

With reference to FIG. 9, at operation 910, the processor may receive an image 1 being photographed. The processor may be configured to identify a plurality of subjects in the image 1 and recommend an n-th priority subject among the identified subjects in accordance with a predetermined recommendation priority at operations 920 to 940. According to an embodiment, the processor may perform operation of comparing a subject identified and/or recommended in a previously received image (e.g., image 1) and being photographed at its ROI and a subject identified and/or recommended in the next received image (e.g., image 2). For example, the processor may determine that the subject identified in the image 2 has a higher recommendation priority than the subject identified and/or recommended in the image 1. In this case, the processor may be configured to photograph the ROI of the subject determined to have a higher recommendation priority in the image 2 instead of the subject identified and/or recommended in the image 1 and being photographed at its ROI.

With reference to FIG. 9, the processor may be configured to recommend a first priority subject or a second priority subject existing in the image 1 at operation 940. The processor may receive the image 2 corresponding to the frame after the image 1 at operation 950, and determine the ROI of the first or second priority subject at operation 960. The ROI may relate to a partial region (e.g., a face or a body) of the subject (e.g., a person). The processor may be configured to differently apply the ROI depending on the type (e.g., a person, an animal, a thing) of a subject to be photographed.

With reference to FIG. 9, the processor may be configured to display the determined ROI at operation 970 and receive an image 3 corresponding to the frame following the image 2 at operation 990. The processor may be configured to, while repeatedly performing the operations 910 to 990, compare subjects in the previously received image and the image corresponding to the next frame, identify and/or recommend a photographing target subject being changed in accordance with the recommendation priority, and display its ROI.

With reference to FIG. 9, the processor may be configured to recommend the subject itself at operation 980 when the ROI of the identified and/or recommended subject is not found at the operation 960. In this case, instead of displaying a bounding box or the like in the ROI of the subject on the photographing main screen of the display of the electronic device, an identifier may be displayed on the subject itself (e.g., 710 in FIG. 7, 720 in FIG. 7).

FIGS. 10A to 10D are exemplary views illustrating a subject identification and recommendation process in a photographing method according to various embodiments of the disclosure. According to various embodiments, FIGS. 10A to 10D may correspond to examples of operations performed by the processor shown in the flowchart of FIG. 8.

With reference to FIGS. 10A to 10D, the processor (e.g., the processor 120 in FIG. 1, the processor 210 in FIG. 2) may sequentially receive images 1001 to 1004. For example, the processor may receive an image 1 indicated by 1001, an image 2 indicated by 1002, an image 3 indicated by 1003, and an image 4 indicated by 1004 from the camera (e.g., the image sensor) of the electronic device in an order with time-series continuity.

Figure 10A:
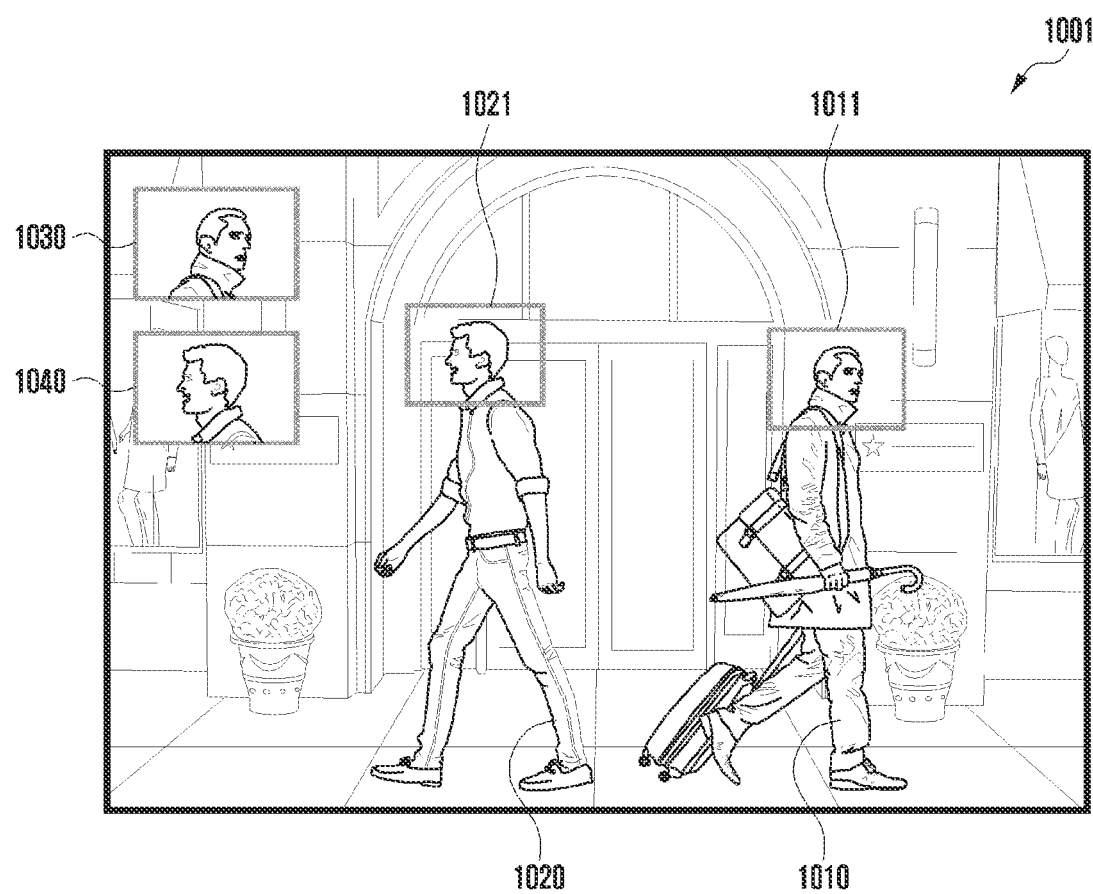
FIGS. 10A to 10D are exemplary views illustrating a subject identification and recommendation process in a photographing method according to various embodiments of the disclosure.

With reference to FIG. 10A, the processor may be configured to identify and recommend a first subject 1010, a second subject 1020, an ROI 1011 of the first subject 1010, and an ROI 1021 of the second subject 1020 from the received image 1001 (e.g., image 1). Also, the processor may be configured to display a cropped image 1030 of the ROI 1011 of the first subject 1010 and a cropped image 1040 of the ROI 1021 of the second subject 1020 on a partial area of the received image 1001 (here, a top left corner of the image 1001, although other configurations are within the contemplated scope of this disclosure). In some embodiments, the processor may identify one or more subjects (e.g., first subject 1010 and second subject 1020) in accordance with a predetermined criterion. Also, the processor may be configured to recommend the identified subjects (e.g., first subject 1010 and second subject 1020) as a first priority subject (e.g., first subject 1010) and a second priority subject (e.g., second subject 1020) in accordance with a predetermined recommendation priority. In the case that a plurality of subjects fall under the same category (e.g., person, animal, thing, etc.), prioritization of recommendations may be made by an arbitrary algorithm. In some embodiments, an AI processor or a processor capable of machine learning may make recommendations by prioritizing a particular subject when the AI processor (or machine learning system) has accumulated experience (i.e., learned) that the respective subject is being frequently photographed by the camera of the corresponding electronic device.

According to an embodiment, the processor may be configured to display an identifier on a predetermined ROI for each identified and/or recommended subject. For example, the processor may be configured to display a bounding box around the ROI 1011 of the first subject 1010 (as shown, a face of the first priority subject) and display a bounding box around the ROI 1021 of the second subject 1020 (as shown, a face of the second priority subject). In some embodiments, each identifier may be displayed to be distinguishable. For example, each identifier (e.g., bounding box, highlight, arrow, etc.) can be provided with a different color, hashing, font, etc. According to another embodiment, the processor may be configured to display the cropped image 1030 of the ROI 1011 of the first priority subject and the cropped image 1040 of the ROI 1021 of the second priority subject on a partial area of the received image 1001 at a resolution different from the remaining portions of the received image 1001.

Figure 10B:
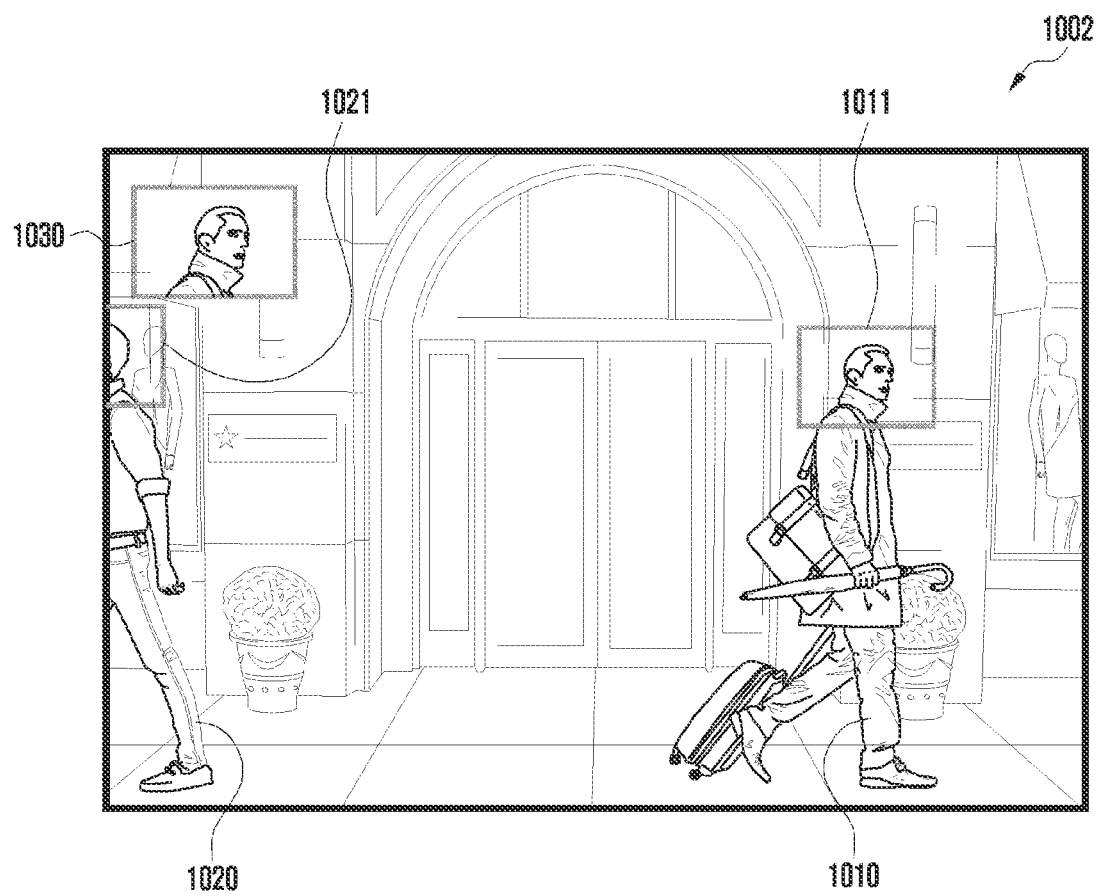

With reference to FIGS. 10A and 10B, the processor may be configured to perform a re-identification and/or re-recommendation process by comparing the received image 1002 (e.g., image 2) with the subject(s) identified and/or recommended in the previously received image 1001.

According to an embodiment, the processor may compare the previously received image 1001 (e.g., image 1) and the received image 1002 (e.g., image 2), identify and/or recommend the first priority subject (e.g., first subject 1010) and the ROI (e.g., ROI 1011) of the first priority subject within the entire field of view of the electronic device, and display the cropped image 1030. At this time, because the first priority subject does not deviate from the angle of view, the cropped image 1030 may be still displayed.

According to another embodiment, because the second priority subject identified and/or recommended in the previously received image 1001 (e.g., image 1) does not exist in the received image 1002 (e.g., image 2) (e.g., out of the entire angle of view of the electronic device), the processor may determine that the identification and/or recommendation has failed, and may not display the cropped image 1040. For example, the processor may determine that the ROI 1021 (here, a face), which is the ROI of the second priority subject (e.g., second subject 1020), is only partially included in the angle of view of the electronic device, and thus the processor may display only the ROI 1021 (or, as shown, a portion thereof) without displaying the cropped image 1040.

Figure 10C:
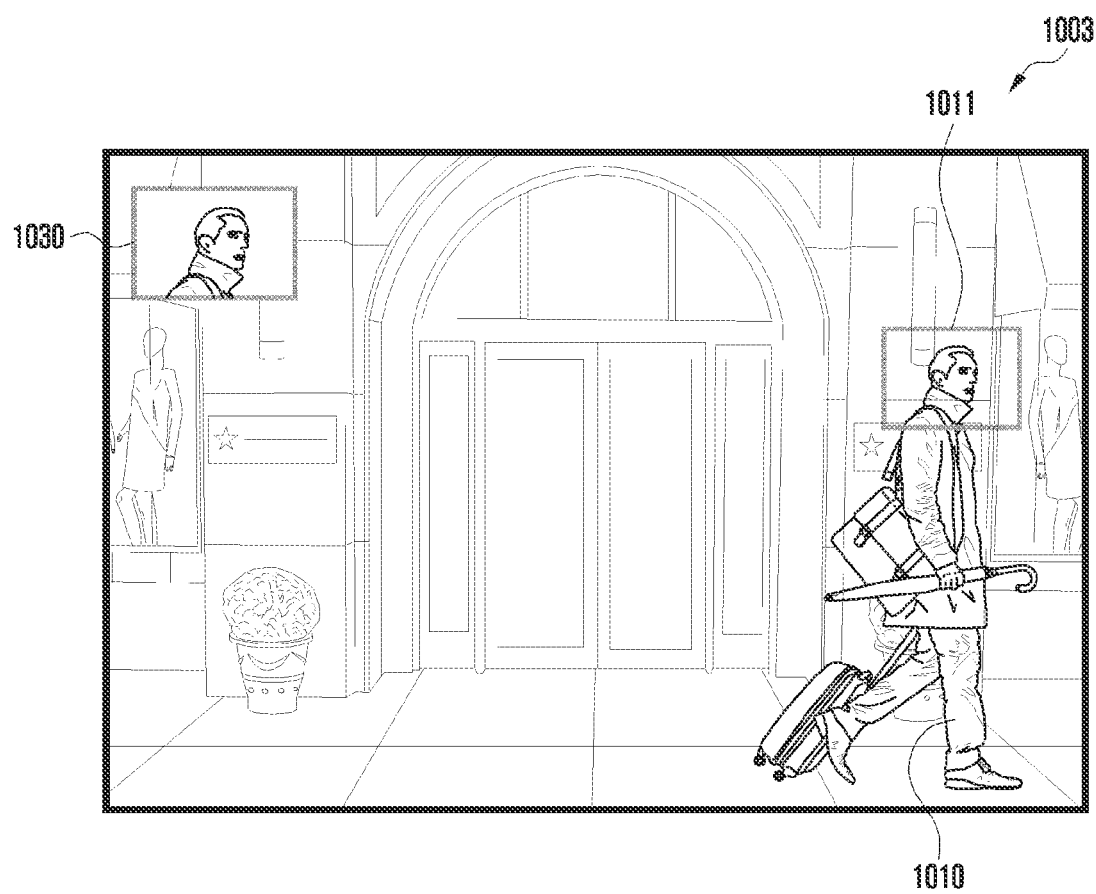

With reference to FIGS. 10B and 10C, the processor may be configured to perform a re-identification and/or re-recommendation process by comparing the received image 1003 (e.g., image 3) with the subject identified and/or recommended in the previously received image 1002.

According to an embodiment, the processor may compare the previously received image 1002 (e.g., image 2) and the received image 1003 (e.g., image 3), identify and/or recommend the first priority subject (e.g., first subject 1010) and the ROI (e.g., ROI 1011) of the first priority subject within the entire field of view of the electronic device, and display the cropped image 1030. At this time, because the first priority subject does not deviate from the angle of view, the cropped image 1030 may be still displayed.

According to another embodiment, because the second priority subject identified and/or recommended in the previously received image 1002 (e.g., image 2) does not exist in the received image 1003 (e.g., image 3) (e.g., out of the entire angle of view of the electronic device), the processor may determine that the identification and/or recommendation has failed, and may not display the cropped image 1040. For example, unlike determining that the ROI 1021, which is the face of the second priority subject (e.g., second subject 1020), is partially included in the angle of view of the electronic device in the image 1002 (e.g., image 2) of FIG.

10B, the processor may determine that, in the image 1003 (e.g., image 3) of FIG. 10C, the ROI 1021 of the second priority subject (e.g., second subject 1020) has completely deviated from the angle of view, and thus may not display the ROI 1021 and/or the cropped image 1040.

Figure 10D:
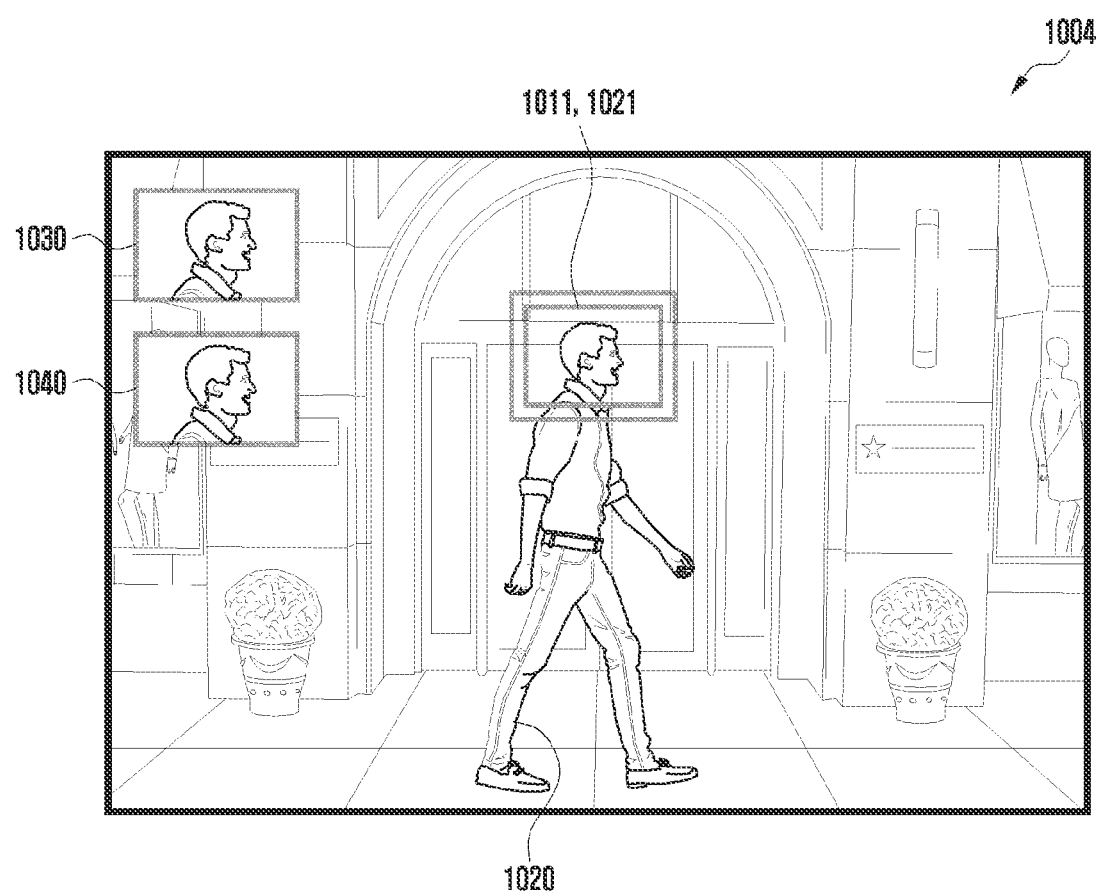

With reference to FIGS. 10C and 10D, the processor may be configured to perform a re-identification and/or re-recommendation process by comparing the received image 1004 (e.g., image 4) with the subject(s) identified and/or recommended in the previously received image 1003.

According to an embodiment, the processor may compare the previously received image 1003 (e.g., image 3) and the received image 1004 (e.g., image 4), identify and/or recommend the first priority subject (e.g., first subject 1010) and the ROI (e.g., ROI 1011) of the first priority subject within the entire field of view of the electronic device, and display the cropped image 1030. With respect to FIG. 10C, the processor may determine that the second priority subject (e.g., second subject 1020) does not exist in the received image 1003, and thus may not display the ROI 1021 and the cropped image 1040 for the second priority subject.

According to another embodiment, the second priority subject (e.g., the second subject 1020) that was not identified and/or recommended because of not existing in the previously received image 1003 (e.g., image 3) is present in the received image 1004 (e.g., image 4) (e.g., included within the entire field of view of the electronic device), and thus the processor may identify and/or recommend it. For example, the processor may display the second priority subject (e.g., second subject 1020), the ROI 1021 of the second priority subject, and the cropped image 1040 for the ROI.

According to an embodiment, the processor may compare the previously received image 1003 (e.g., image 3) and the received image 1004 (e.g., image 4), and determine that the second priority subject appears (e.g., exists) at the same/similar position as the position of the disappearing first priority subject. For example, the processor may determine that the first priority subject (e.g., first subject 1010) disappears because the second priority subject (e.g., second subject 1020) appears at the same/similar coordinates as the coordinates where the first priority subject is located in the image 1003 of FIG. 10C. Therefore, the processor may simultaneously display the ROI (e.g., ROI 1011) and the cropped image 1030 of the first priority subject and the ROI (e.g., ROI 1021) and the cropped image 1040 of the second priority subject. In some embodiments, when multiple ROIs are identified in a same or substantially same area, one or more of the ROI identifiers (e.g., boxes, etc.) can be resized such that all ROIs can fit in the desired area (as shown in FIG. 10D).

Figure 11:
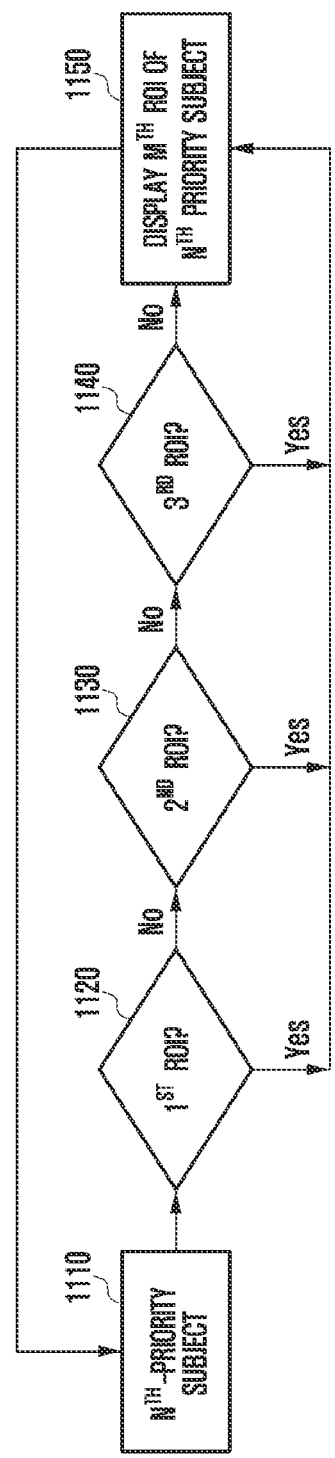
FIG. 11 is a flowchart illustrating a process of detecting an ROI for each subject in a photographing method according to various embodiments of the disclosure.

FIG. 11 is a flowchart illustrating a process of detecting an ROI for each subject in a photographing method according to various embodiments of the disclosure.

With reference to FIG. 11, the processor (e.g., the processor 120 in FIG. 1, the processor 210 in FIG. 2) may identify a subject in accordance with a predetermined criterion, recommend an n-th priority subject in accordance with a recommendation priority of the identified subject, and determine an ROI for the n-th priority subject.

According to an embodiment, the processor may be configured to repeatedly perform operations 1110 to 1150 in determining the ROI for the n-th priority subject in accordance with a predetermined recommendation priority. At operation 1110, the processor may determine the ROI of the n-th priority subject identified and/or recommended from the received image. Here, the ROI may refer to a main photographing part (e.g., region) of a subject to be photographed through the camera of the electronic device (e.g., the electronic device 101 in FIG. 1, the electronic device 200 in FIG. 2).

According to an embodiment, the processor may receive information about the predetermined ROI through a memory, an external device, AI, or machine learning. The ROI may relate to a partial region (e.g., a face or a body) of the subject (e.g., a person). The processor may be configured to differently apply the ROI depending on the type (e.g., a person, an animal, a thing) of a subject to be photographed.

With reference to FIG. 11, at operation 1150, the processor may be configured to display an m-th ROI of the n-th priority subject. At this time, if the processor fails to detect the ROI for the n-th priority subject, the processor may display the entire n-th priority subject as the ROI (e.g., 710 in FIG. 7, 720 in FIG. 7).

According to another embodiment, at operation 1120 to 1150, the processor may determine a predetermined ROI for each subject and display an identifier such as a bounding box on the determined ROI.

Figure 12:
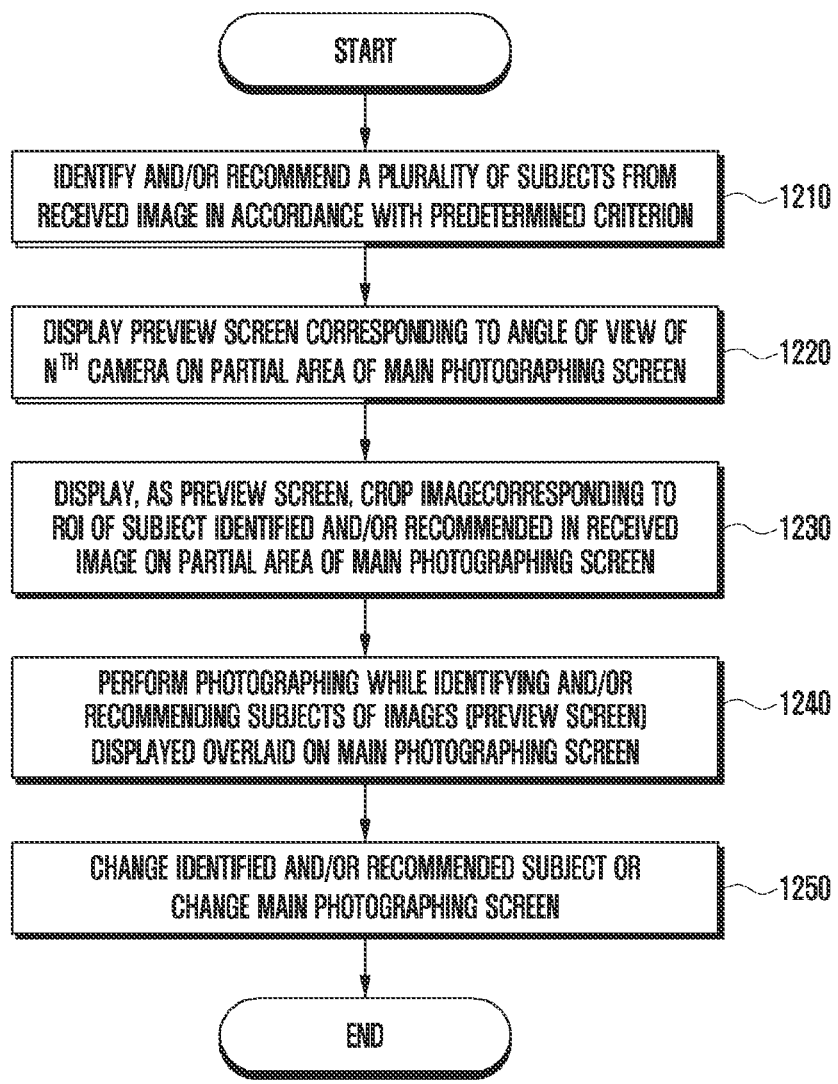
FIG. 12 is a flowchart illustrating a method of photographing a subject at various angles of view of an electronic device according to various embodiments of the disclosure.

FIG. 12 is a flowchart illustrating a method of photographing a subject at various angles of view of an electronic device according to various embodiments of the disclosure. In the following embodiments, respective operations may be performed sequentially, but are not necessarily performed sequentially. For example, the order of respective operations may be changed, and at least two or more operations may be performed in parallel.

According to an embodiment, the processor may be configured to identify and/or recommend a plurality of subjects from a received image in accordance with a predetermined criterion at operation 1210. For example, the processor may receive images sequentially frame by frame. In this case, the processor may be configured to identify and/or recommend a plurality of subjects for each frame-by-frame image and determine the identity of the subject by comparing it with a previous image or re-identify and/or re-recommend the subject by comparing it under a predetermined criterion and/or recommendation priority.

According to various embodiments, the electronic device may include a plurality of cameras. For example, the electronic device may be equipped with a plurality of cameras having different angles of view, such as a first camera, a second camera, a third camera, and an n-th camera. With reference to FIG. 12, the processor may be configured to display a preview screen corresponding to an angle of view (e.g., the n-th angle of view) of the n-th camera to be overlaid on a partial area of a main photographing screen at operation 1220. According to an embodiment, the main photographing screen may correspond to an n-th image being photographed to correspond to the n-th angle of view of the n-th camera. In addition, the preview screen (e.g., images) displayed overlaid on a partial area of the main photographing screen may contain the n-th image being photographed to correspond to the n-th angle of view of the n-th camera and/or crop images of subjects identified and/or recommended from the n-th image and being displayed as ROIs.

With reference to FIG. 12, the processor may detect, as the preview screen, crop images corresponding to the ROI for each subject identified and/or recommended from the received image. In this case, the processor may be configured to display the detected crop images to be overlaid on a partial area of the main photographing screen at operation 1230.

With reference to FIG. 12, the processor may receive images being photographed for each frame and repeatedly identify and/or recommend a subject in accordance with a predetermined criterion. According to an embodiment, the processor may be configured to perform photographing at operation 1240 while re-identifying and/or re-recommending the subjects of images displayed overlaid on the main photographing screen for each frame. In addition, the processor may be configured to perform control such as changing a corresponding subject or changing the main photographing screen at operation 1250 based on a user input made in a photographing UI.

The processor may be an AI processor and/or a processor capable of machine learning. A method for the processor to detect a subject is not limited to a specific one and may be performed variously. The processor may receive an image from the camera of the electronic device and identify a subject (e.g., a person, an animal, a thing, etc.) based on the received image. According to an embodiment, the processor may be configured to detect a subject through AI-based processing on the received image. For example, the processor may include a function block (e.g., an object detection function block, etc.) for detecting a subject by learning data accumulated based on AI and/or data inputted from an external server or the like.

The processor may be configured to determine the position and/or size of the detected object in the received image in addition to AI-based object detection (e.g., subject detection). The processor may include an AI-based function block (e.g., a subject type determination function block) that crops an image of the detected and/or determined subject and determines the type of the subject of the cropped image. For example, the processor may be configured to determine the position and/or size of the subject in the received image, based on AI, and determine the subject type (e.g., a person, an animal, a thing, etc.), based on the cropped image of a partial area of the subject.

The detection of the subject, the determination of the position and/or size of the detected subject in the image, and the determination of the subject type based on the cropped image of the detected subject through the processor of the electronic device may not be sequentially performed. For example, the processor may be configured to identify a subject based on AI, recommend the identified subject in accordance with a predetermined recommendation priority, and display an identifier emphasizing a region of interest for the recommended subject. Here, identifying the subject by the AI processor may be detecting an object based on AI in accordance with a predetermined criterion and determining the position and/or size of the detected object in the received image. Also, displaying the identifier for emphasizing the region of interest for the recommended subject by the AI processor may correspond to cropping the subject part of the image and determining its type by the subject type determination function block. According to another embodiment, the processor may be configured to determine the subject type based on the cropped image or to crop the ROI of the subject after identifying the subject.

Figure 13:
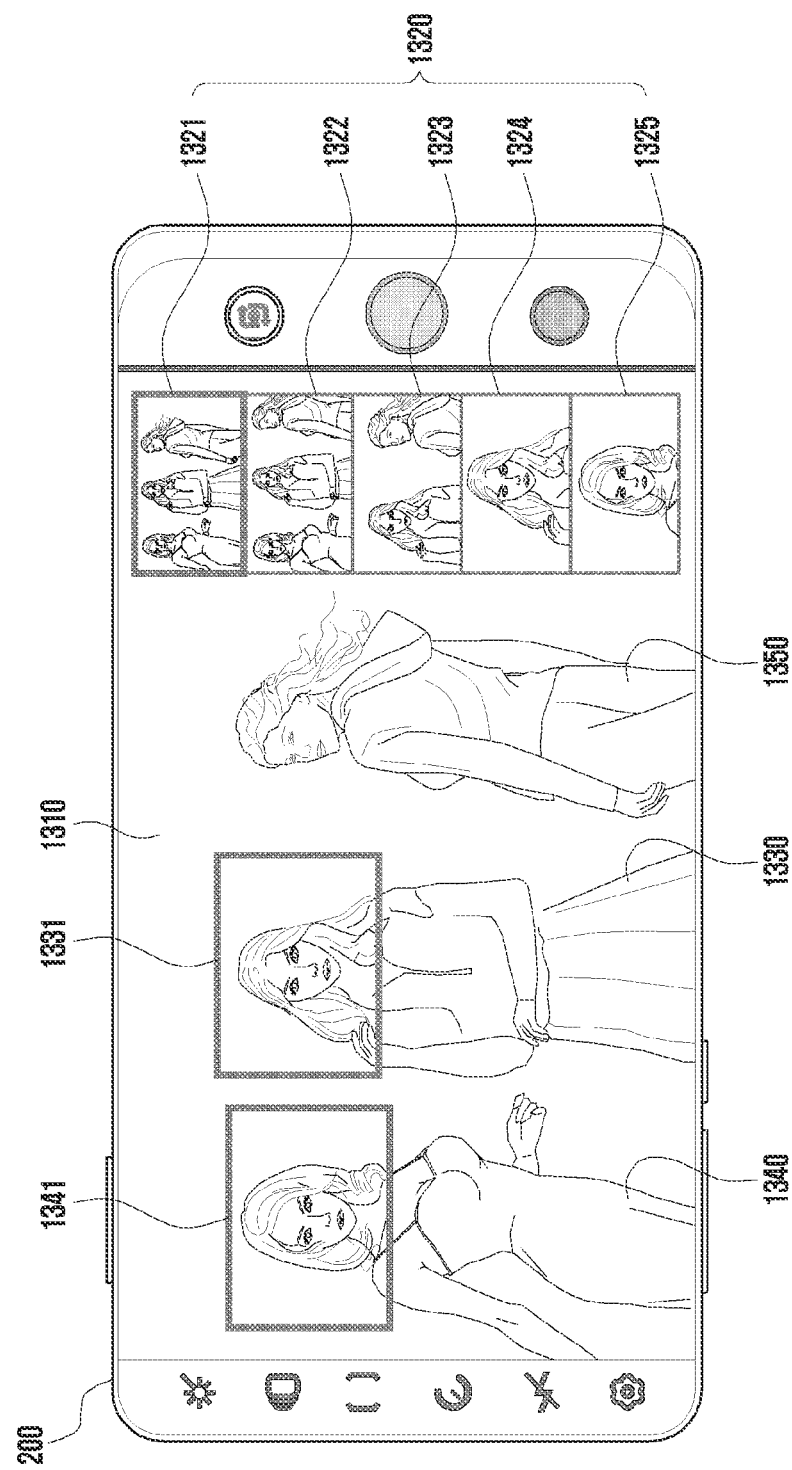
FIG. 13 is an exemplary view illustrating a photographing screen of an electronic device according to various embodiments of the disclosure.

FIG. 13 is an exemplary view illustrating a photographing screen of an electronic device according to various embodiments of the disclosure.

With reference to FIG. 13, an identified and/or recommended subject and a plurality of images (e.g., main photographing screen 1310 and overlaid images 1320) may be displayed on the photographing screen using the camera (e.g., the camera module 180 in FIG. 1, the camera 220 in FIG. 2) of the electronic device 200 (e.g., the electronic device 101 in FIG. 1).

With reference to FIG. 13, subjects 1330, 1340, and 1350 to be photographed are displayed as three persons. In the photographing screen, a person in the center may be referred to as a first subject 1330, a person on the left may be referred to as a second subject 1340, and a person on the right may be referred to as a third subject 1350. An ROI 1331 of the first subject and an ROI 1341 of the second subject may be displayed with different identifiers on the display of the electronic device.

According to various embodiments, a main photographing screen 1310 (e.g., also referred to as the first image) shown in FIG. 13 may display an image being photographed at the first angle of view of the first camera. The overlaid images 1320 displayed overlaid on a partial area of the main photographing screen 1310 on the display of the electronic device may be images being photographed simultaneously with the main photographing screen 1310. For example, the overlaid images 1320 may include an image 1321 being photographed at a first angle of view of the first camera of the electronic device (here, a copy of the first image of the main photographing screen 1310), an image 1322 being photographed at a second angle of view of the second camera, an image 1323 being photographed at a third angle of view of the third camera, a cropped image 1324 of the ROI of the first subject, and a cropped image 1325 of the ROI of the second subject. The main photographing screen 1310 may be the same as the image 1321 selected with a thick border from among the overlaid images 1320. For example, the user may select one of the overlaid images 1320 to be displayed on the main photographing screen 1310. When the camera of the electronic device is driven to start photographing, the main photographing screen 1310 and image 1321 may be displayed as a default screen.

With reference to FIG. 13, the main photographing screen 1310 may correspond to one of the overlaid images 1320 displayed overlaid in a preview form. In order to indicate the image currently displayed on the main photographing screen 1310, a distinguishing form (e.g., a thick bounding box formed around image 1321) may be displayed together on one of the overlaid images 1320.

According to an embodiment, the processor of the electronic device may identify subjects in accordance with a predetermined criterion, and may recommend and display a subject among the identified subjects in accordance with a recommendation priority. With reference to FIG. 13, only ROIs 1331 and 1341 of some subjects 1330 and 1340 among the plurality of subjects 1330, 1340, and 1350 may be displayed. For example, the processor may be implemented with an AI processor or a processor capable of machine learning, and a subject (e.g., 1330 and 1340) that is repeatedly photographed by the user of the electronic device may be determined as a recommendation priority. The example shown in FIG. 13 merely corresponds to an embodiment of the photographing method of the disclosure, and the subject 1350 whose ROI is not displayed may also be displayed with the ROI selected. The photographing method according to various embodiments may be variously performed by changing a predetermined criterion for identifying a subject, a predetermined recommendation priority for the identified subjects, and/or a predetermined ROI for each subject.

Expressions for the first subject, the second subject, the n-th subject, etc. used herein may not be the concept of the order corresponding to a recommendation priority of the identified subject and may correspond to an index number for merely distinguishing the subjects.

Figure 14A:
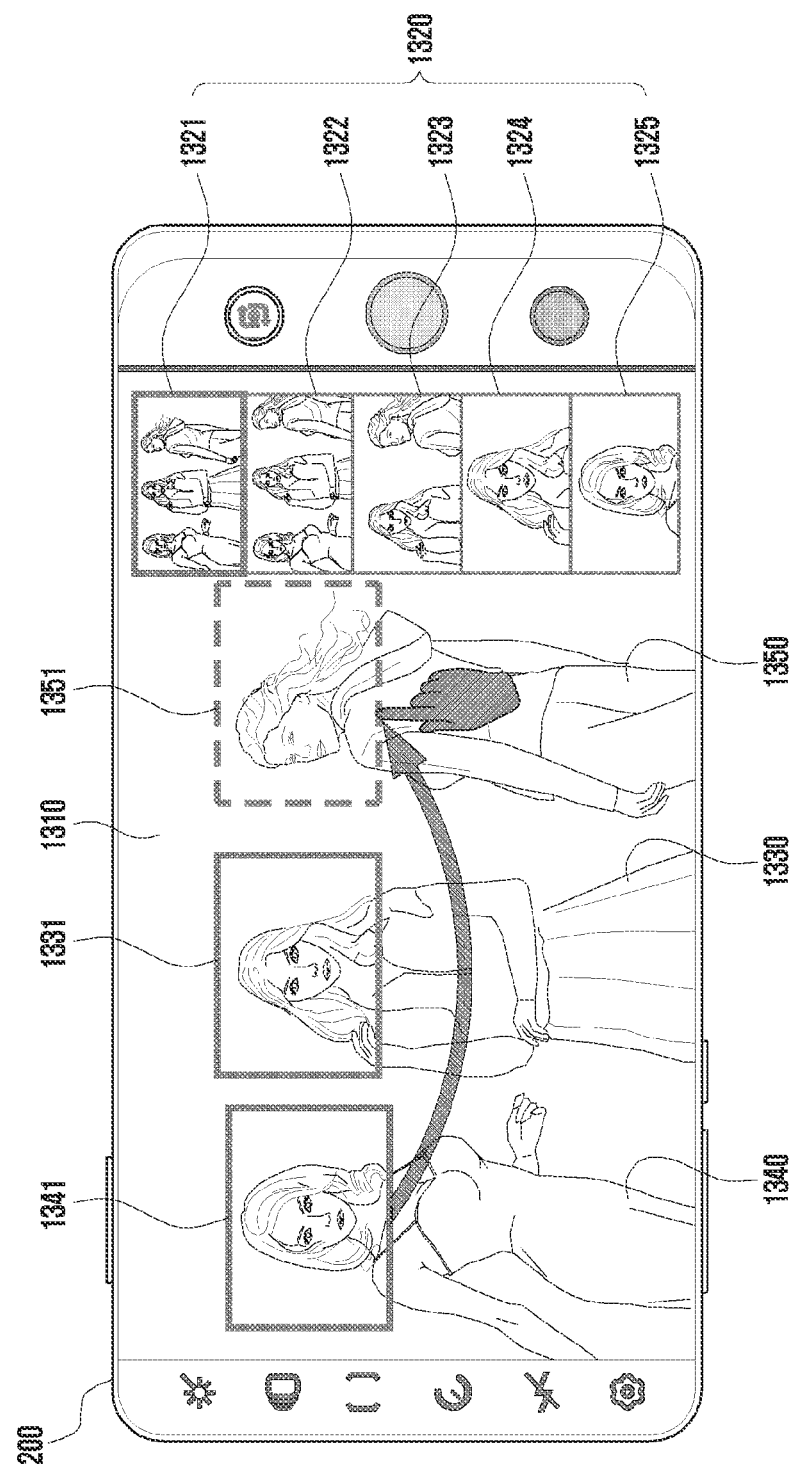
FIGS. 14A and 14B are exemplary views illustrating a change of an identified subject in a photographing method according to various embodiments of the disclosure.
Figure 14B:
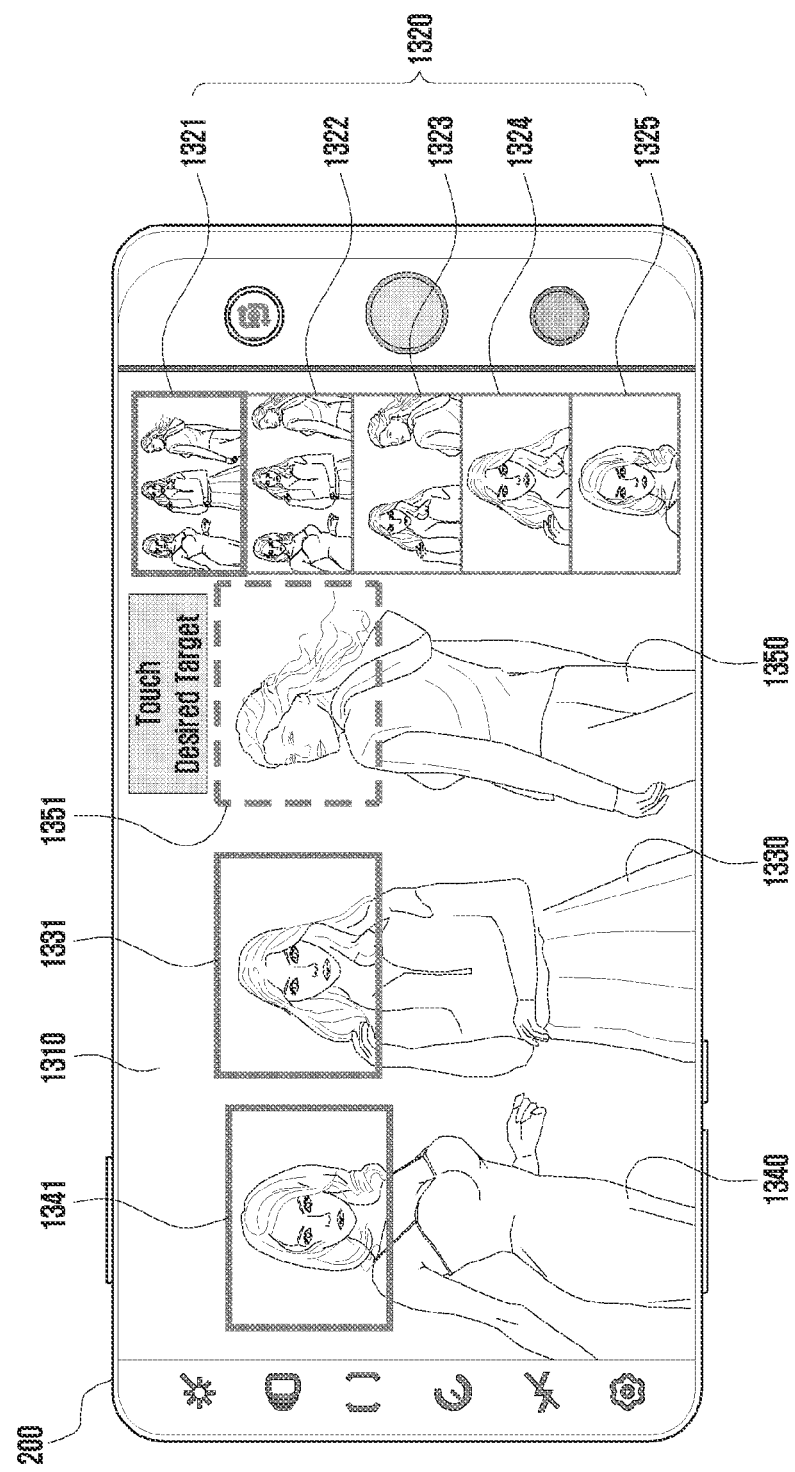

FIGS. 14A and 14B are exemplary views illustrating a change of an identified subject in a photographing method according to various embodiments of the disclosure.

With reference to FIGS. 13 and 14A, the user of the electronic device may use a touch input (e.g., a drag and drop, a long press, etc.) for changing the subject on the main photographing screen. For example, the user may apply a touch input for changing to an identified subject (e.g., the third subject 1350) other than the recommended subjects (e.g., the first subject 1330 and the second subject 1340) among the identified subjects in FIG. 13. With reference to FIG. 14A, when the user drags and drops a touch input for selecting the ROI 1341 of the second subject to the ROI 1351 of the third subject, the processor may determine that the predetermined recommendation priority is changed and thus the photographing target is changed to the third subject 1350. For example, upon receiving a user's input of changing the photographing target from the second subject 1340 to the third subject 1350, the processor may remove the display of the ROI 1341 of the second subject and generate the display of the ROI 1351 of the third subject.

The processor may detect a user's touch input on the main photographing screen through a sensor module or the like, and display a change in the subject in response to the detected input. A method of changing the subject through the user's touch input is not considered as a limitation.

With reference to FIGS. 13 and 14B, the user of the electronic device may use a touch input (e.g., press) for changing the subject on the main photographing screen. For example, the user may apply a touch input for changing to an identified subject (e.g., the third subject 1350) other than the recommended subjects (e.g., the first subject 1330 and the second subject 1340) among the identified subjects in FIG. 13. With reference to FIG. 14B, when the user applies a touch input of selecting the ROI 1351 of the third subject, the processor may determine that the predetermined recommendation priority is changed and thus the photographing target is changed to the third subject 1350. For example, upon receiving a user's input of changing the photographing target from the second subject 1340 to the third subject 1350, the processor may remove the display of the ROI 1341 of the second subject and generate the display of the ROI 1351 of the third subject.

The change of the photographing target subject described in FIGS. 14A and 14B may be applied differently depending on the type of individual electronic device and/or the type of application, and may be customized and applied by the user.

Figure 15:
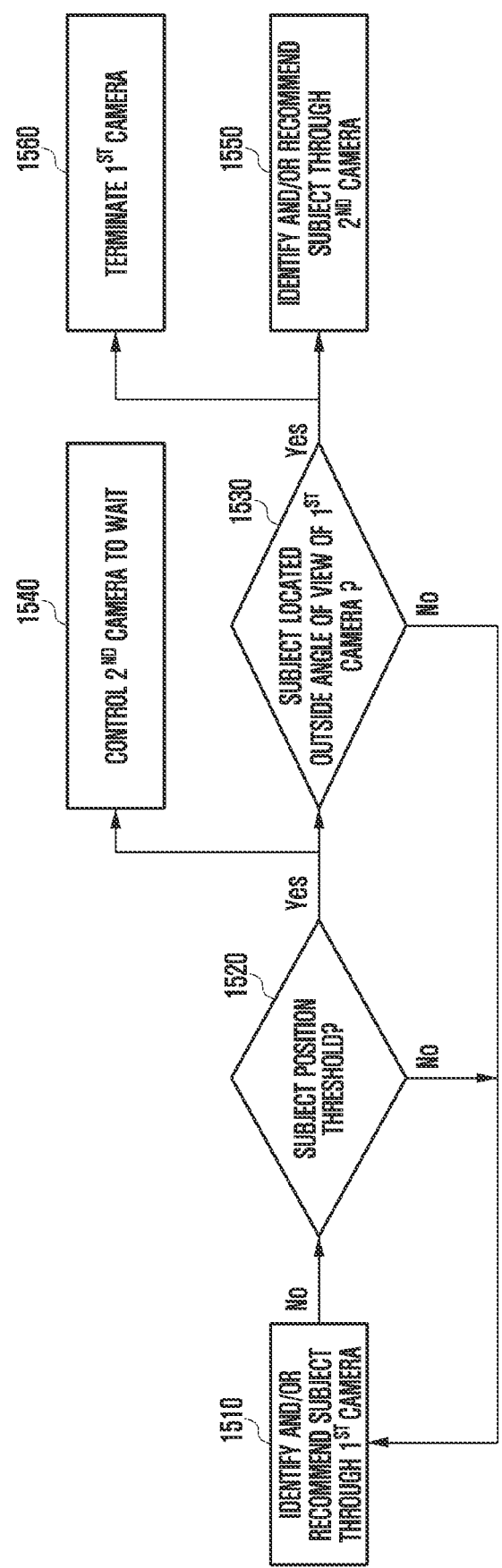
FIG. 15 is a flowchart illustrating a camera change process through camera calibration of an electronic device according to various embodiments of the disclosure.

FIG. 15 is a flowchart illustrating a camera change process through camera calibration of an electronic device according to various embodiments of the disclosure.

According to various embodiments, the processor may be configured to form integrated coordinates for a plurality of cameras through camera calibration. Such coordinate formation may be usefully utilized when a subject is across a boundary of a photographing range that can be photographed by the plurality of cameras. For example, the subject may be located at the boundary of the first angle of view of the first camera. In this case, the processor may change photographing to the second camera so that the subject can be photographed using the second camera having a second angle of view wider than the first angle of view. In another embodiment, the main photographing screen may be displayed as an image being photographed by the first camera. In this case, if the identified and/or recommended subject is located at the boundary of the first angle of view of the first camera and thus a partial area is cut off, the main photographing screen may be changed to the image being photographed by the second camera having a wider photographing range than the first camera. Therefore, the processor may be configured to, while photographing a desired subject with a plurality of cameras, change the camera or change the main photographing screen on the photographing UI so that there is no inconvenience such as cutting of the ROI for the subject.

With reference to FIG. 15, the processor may identify and/or recommend a subject in a photographed image using the first camera at operation 1510. For example, the processor may determine the location of the identified and/or recommended subject. In this case, the processor may determine a position in the coordinate system through camera calibration. With reference to FIG. 15, the processor may configure coordinate values corresponding to angles of view of a plurality of cameras as a threshold value. For example, the processor may be configured to determine the coordinates of a limit region or boundary region of the photographing range, such as the first angle of view, the second angle of view, and the n-th angle of view, as a threshold value, or configured to load a predetermined and stored threshold value. According to an embodiment, the processor may determine at operation 1520 whether the location of the subject identified and/or recommended and being photographed is at the coordinates corresponding to the threshold value. For example, the processor may be configured to compare the coordinates of the center of the subject, the coordinates of the overall shape of the subject, or the coordinates of the ROI of the subject, as the location of the subject, with the threshold value.

According to various embodiments, the second camera of the electronic device may photograph a larger area than the first camera. When determining that at least a portion of the coordinates of the subject position deviates from the threshold value, the processor may control the second camera to wait to change the photographing camera to the second camera. Also, the processor may be configured to check at operation 1530 whether the coordinates of the position of the subject are located outside the angle of view (e.g., the first angle of view) of the first camera.

With reference to FIG. 15, when the subject is being photographed outside the angle of view of the first camera or across the boundary of the photographing range depending on the angle of view, the processor may control the first camera to be terminated. Also, the processor may be configured to identify and/or recommend the subject by changing from the first camera to the second camera.

According to an embodiment, the processor may be configured to check the overall coordinates and the coordinates for each angle of view through calibration. For example, the processor may be configured to perform photographing by changing to a camera having an angle of view that can include all coordinates of the ROI in the case that the coordinates of the ROI of the subject exceed the threshold value. In addition, the processor may be configured to display an image being photographed by the camera before the change over a partial area of an image (e.g., the main photographing screen) being photographed by the camera after the change.

Figure 16A:
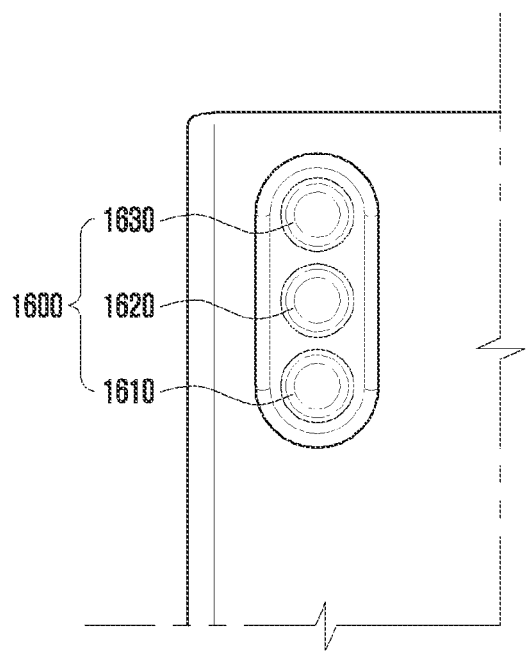
FIGS. 16A to 16C are diagrams illustrating subject identification through a camera change of an electronic device according to various embodiments of the disclosure.
Figure 16B:
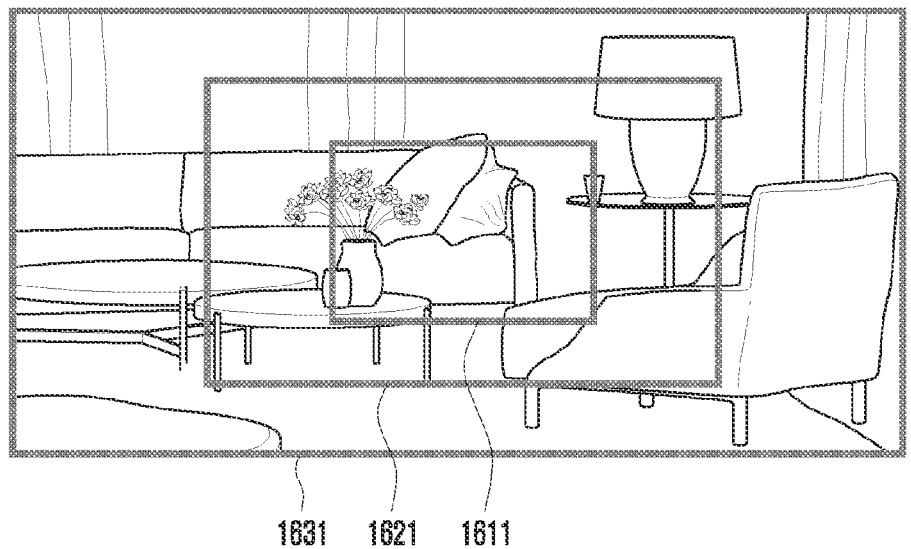
Figure 16C:
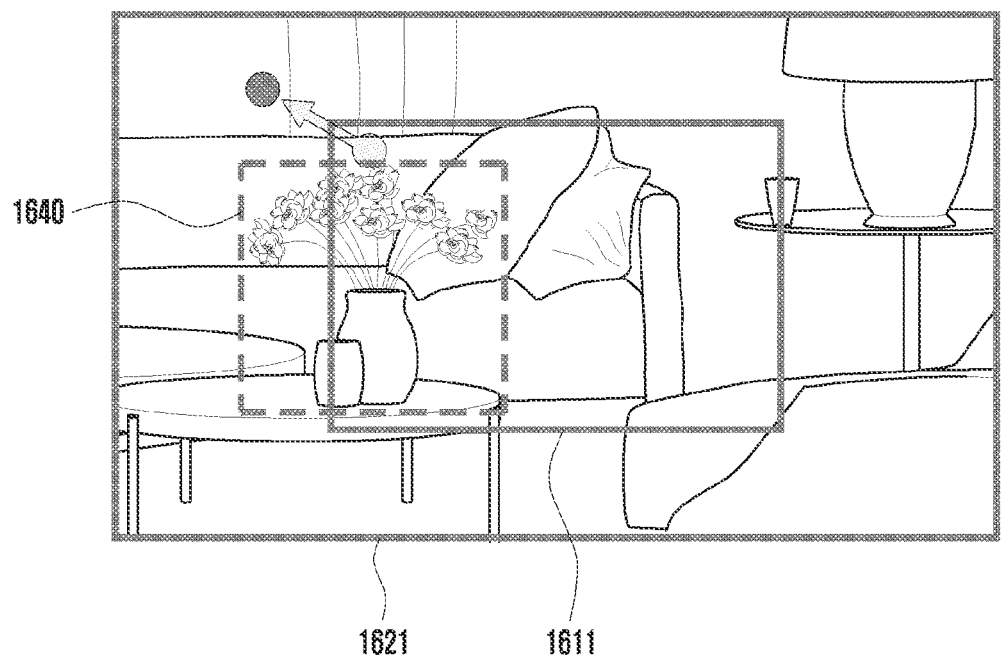

FIGS. 16A to 16C are diagrams illustrating subject identification through a camera change of an electronic device according to various embodiments of the disclosure.

FIG. 16A is an enlarged view of a plurality of cameras 1600 of the electronic device (e.g., the electronic device 101 in FIG. 1, the electronic device 200 in FIG. 2). The plurality of cameras (e.g., the camera module 180 in FIG. 1, the camera 220 in FIG. 2) are a plurality of lens assemblies of the camera module, and may include an image sensor located on the front and/or rear of the electronic device to perform photographing.

With reference to FIG. 16A, individual cameras of the electronic device including the plurality of cameras 1600 may include a first camera 1610, a second camera 1620, and a third camera 1630. Although three cameras are illustrated in FIG. 16A, this is not a limitation, and any camera may be additionally included. According to an embodiment, the first camera 1610 may perform photographing at a first angle of view, the second camera 1620 may perform photographing at a second angle of view, and the third camera 1630 may perform photographing at a third angle of view. Lenses having an angle of view narrowing sequentially from the first angle of view to the third angle of view may be configured. According to another embodiment, lenses having an angle of view extending sequentially from the first angle of view to the third angle of view may be configured. Such an arrangement of the camera may be made arbitrarily.

FIG. 16B shows a photographing range according to the angle of view of an individual camera. With reference to FIG. 16B, in case that an arbitrary space is being photographed while the electronic device is fixed, the first camera 1610 may photograph the range of a first area 1611 based on the first angle of view. In another embodiment, the second camera 1620 may photograph up to a second area 1621 including the first area 1611 based on the second angle of view, and the third camera 1630 may photograph up to a third area 1631 including the first area 1611 and the second area 1621 based on the third angle of view. Although FIG. 16B shows that the first angle of view of the first camera 1610 is the narrowest and the third angle of view of the third camera 1630 is the widest, this is only an example and may be changed depending on camera arrangement and setting of the electronic device.

FIG. 16C shows an embodiment in which a camera is changed when an identified and/or recommended subject to be photographed is located in a boundary area between individual cameras. For example, the processor of the electronic device having the multi-camera may perform camera calibration by integrating the angle of view (e.g., photographing range) of the entire camera.

In order to integrate and control a plurality of cameras, the processor of the electronic device described herein may perform camera calibration or have coordinate configuration in advance. For example, the processor may generate integrated coordinates in consideration of angles of view of individual cameras by using the central position of the electronic device or the central positions of the plurality of cameras as an origin. Using the coordinates generated as above, the processor may check a threshold value for an individual angle of view corresponding to a range that can be photographed by each individual camera. The processor may control a change of the camera by comparing the position of a subject being identified and/or recommended with a threshold value regarding the photographing range (e.g., n-th area) of the individual camera. For example, the processor may check coordinates of boundary values of the first angle of view of the first camera and the second angle of view of the second camera as a threshold value, and upon determining that a partial area of the subject overlaps with the checked threshold value, change to a camera having a wide angle of view.

According to an embodiment, the processor may establish an integrated coordinate system through camera calibration and thereby smoothly control photographing of a subject. With reference to FIG. 16C, a camera currently used for photographing may be the first camera. For example, while photographing is performed using the first camera of the electronic device, only the first area 1611 may be displayed as the main photographing screen, and the subject 1640 may be located at the boundary of the first area 1611. The processor may determine that the subject 1640 placed on a table is located at the boundary of the first area 1611. The processor may compare the coordinates of a display area of the subject 1640 being photographed and identified and/or recommended with a threshold value of the first area 1611 and thereby enable photographing in the second area 1621. In this case, the processor may control the camera used for photographing to be changed from the first camera to the second camera.

With reference to FIGS. 16A to 16C, after the integrated coordinate system is established through camera calibration, the processor may control the change between the n-th cameras and thereby perform photographing for the ROI of the subject to be photographed.

Figure 17A:
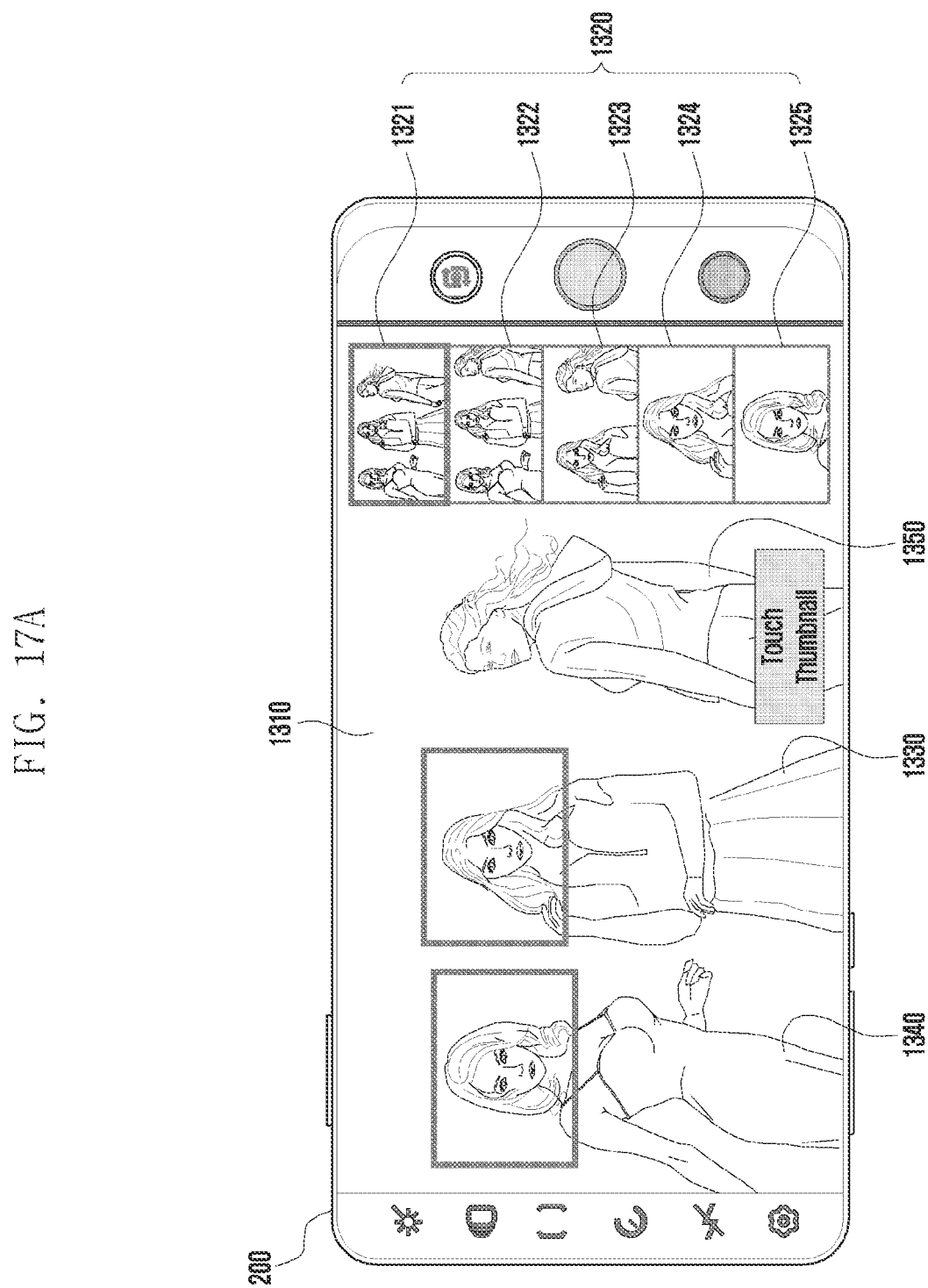
FIGS. 17A and 17B are diagrams illustrating an image change in a photographing method according to various embodiments of the present disclosure.
Figure 17B:
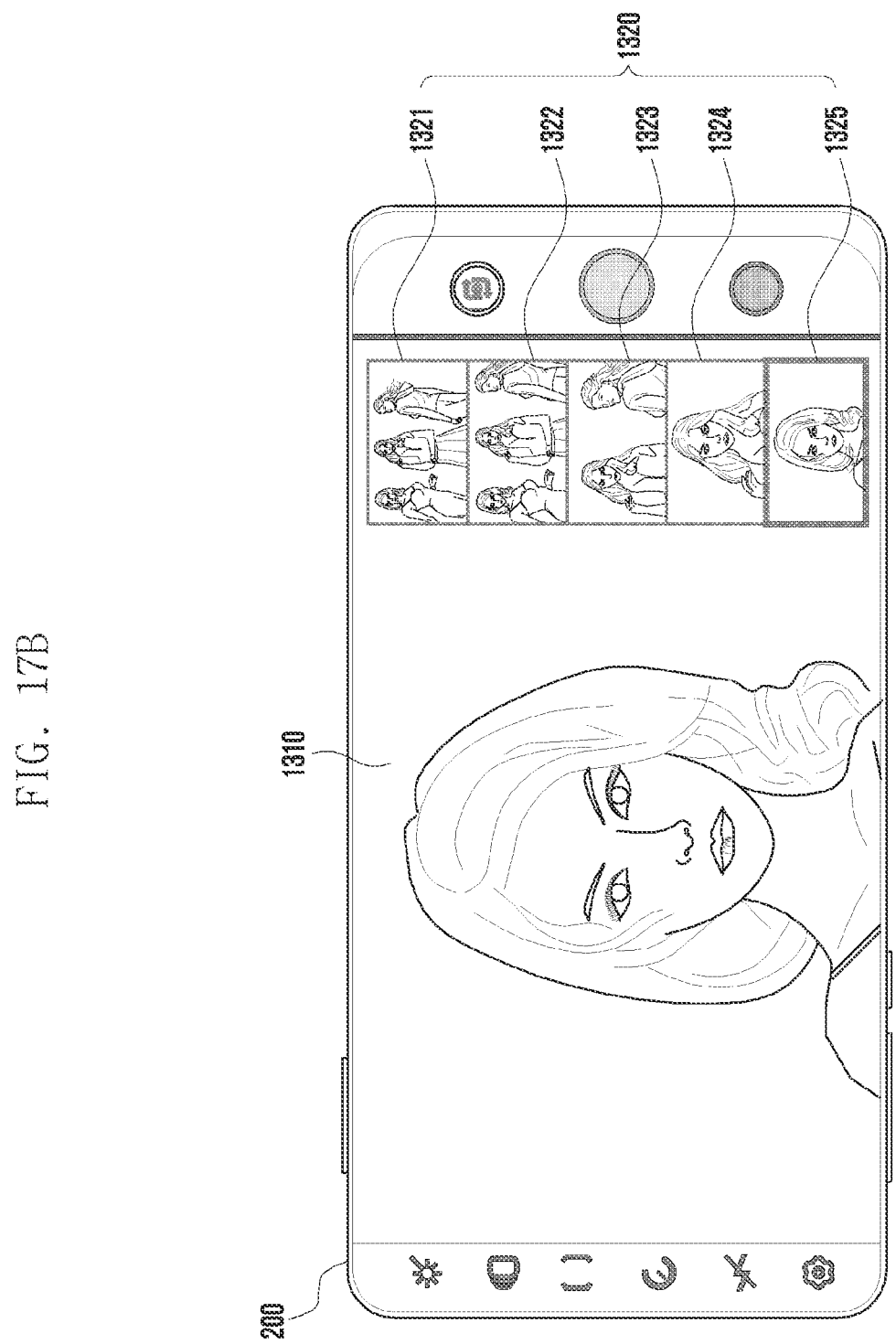

FIGS. 17A and 17B are diagrams illustrating an image change in a photographing method according to various embodiments of the present disclosure.

With reference to FIGS. 13 and 17A, the user has selected the image 1321 (e.g., a first thumbnail image) among the overlaid images 1320 overlaid on the current main photographing screen 1310 to be displayed on the main photographing screen 1310. In this case, the image 1321 among the overlaid images 1320 may be displayed in the form of a bounding box with a thick border indicating that it is currently also being displayed on the main photographing screen 1310.

According to an embodiment, the user may use various inputs for changing the main photographing screen 1310. For example, the user may change the main photographing screen 1310 of the electronic device to the selected image by using a touch input for selecting one of the overlaid images 1320.

With reference to FIGS. 17A and 17B, the user may use a touch input for changing the image being displayed on the main photographing screen 1310 to the cropped image 1325 that is one of the overlaid images 1320. For example, the processor may be configured to detect a user's input of selecting the cropped image 1325 using a sensor module, etc., and change the main photographing screen 1310 from an initial image (e.g., the image 1321) to the cropped image 1325.

According to various embodiments of the disclosure, an electronic device including a multi-camera includes a camera, a display, a memory, and a processor operatively connected to the camera, the display, and the memory, wherein the processor may be configured to receive a first image being photographed at a first angle of view of the camera, to receive a second image being photographed at a second angle of view of the camera, to identify a subject in the first image in accordance with a predetermined criterion, to generate a third image in which the identified subject is cropped depending on a predetermined region of interest (ROI), and to display the second image and the third image on at least a portion of an area in which the first image is displayed, while displaying the first image on the display.

According to various embodiments of the disclosure, the processor may be configured to identify a subject type, a number of subjects, or a subject position when identifying the at least one subject, and recommend the subject in accordance with a predetermined subject recommendation priority.

According to various embodiments of the disclosure, the processor may be configured to perform photographing while displaying the ROI of the subject with an identifier on the first image. The processor may be configured to perform camera calibration including the first angle of view and the second angle of view.

According to various embodiments of the disclosure, the processor may be configured to re-identify the subject in accordance with the predetermined criterion and photograph the subject in case that the subject being photographed deviates from the calibrated angle of view or a new subject is identified, based on the calibrated angle of view. The processor may be configured to photograph the subject at the second angle of view of the camera when the subject being photographed is located at the second angle of view out of the first angle of view, based on the calibrated angle of view. The processor may be configured to replace the first image with the second image of the subject being photographed at the second angle of view and display the second image on the display.

According to various embodiments of the disclosure, the processor may be configured to, in the case of receiving a touch input for selecting the subject being photographed and a drag input for changing to another subject in the first image, re-identify, track, and photograph the changed subject.

According to various embodiments of the disclosure, the processor may be configured to, in case of receiving a touch input for selecting other subject than the subject being photographed, re-identify, track, and photograph the other subject. According to various embodiments, the processor may be configured to, in case of receiving a touch input for selecting the second image or the third image, display the selected second or third image on the area in which the first image is displayed.

According to various embodiments of the disclosure, a photographing method using a multi-camera of an electronic device may include receiving a first image being photographed at a first angle of view of the multi-camera and a second image being photographed at a second angle of view of the multi-camera, identifying a subject in the first image in accordance with a predetermined criterion, generating a third image in which the identified subject is cropped depending on a predetermined region of interest (ROI), and displaying the second image and the third image on at least a portion of an area in which the first image is displayed, while displaying the first image on the display.

According to various embodiments of the disclosure, in the photographing method, the identifying may include identifying a subject type, a number of subjects, or a subject position, and recommending the subject in accordance with a predetermined subject recommendation priority.

According to various embodiments of the disclosure, the photographing method may further include displaying the ROI of the identified subject with an identifier on the first image. According to various embodiments of the disclosure, the photographing method may further include performing camera calibration including the first angle of view and the second angle of view.

According to various embodiments of the disclosure, the photographing method may further include re-identifying the subject in accordance with the predetermined criterion in case that the subject being photographed deviates from the calibrated angle of view or a new subject is identified. According to various embodiments of the disclosure, the photographing method may further include changing the multi-camera to the second angle of view when the subject being photographed is located at the second angle of view out of the first angle of view. According to various embodiments of the disclosure, the photographing method may further include replacing the first image with the second image of the subject being photographed at the second angle of view and displaying the second image on the display.

According to various embodiments of the disclosure, the photographing method may further include, in case of receiving a touch input for selecting the subject being photographed and a drag input for changing to another subject in the first image, re-identifying the changed subject. According to various embodiments of the disclosure, the photographing method may further include, in case of receiving a touch input for selecting other subject than the subject being photographed, re-identifying the other subject. According to various embodiments of the disclosure, the photographing method may further include, in case of receiving a touch input for selecting the second image or the third image, displaying the selected second or third image on the area in which the first image is displayed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a camera;
a display;
memory storing instructions; and
a processor,
wherein the instructions, when executed by the processor, cause the electronic device to:
obtain a first image including a plurality of subjects using the camera having a first angle of view,
identify a first subject and a second subject in the first image,
generate a second image in which the first subject is cropped depending on a predetermined region of interest (ROI) selected by the electronic device according to a type of subject of the first subject, and
display the second image on at least a portion of an area in which the first image is displayed, the second image displayed with a boundary having a color selected according to a predetermined priority of the first subject.

2. The electronic device of claim 1, wherein the instructions, when executed by the processor, cause the electronic device to:
receive a user input for selecting the second subject on the first image,
determine that a photographing target is changed to the second subject based on the user input.

3. The electronic device of claim 2, wherein the instructions, when executed by the processor, cause the electronic device to:
in response to receiving the user input for selecting the second subject, re-identify, track, and photograph the second subject.

4. The electronic device of claim 2, wherein the instructions, when executed by the processor, cause the electronic device to:
upon receiving the user input, remove the ROI of the first subject, and
display a ROI of the second subject.

5. The electronic device of claim 1, wherein the instructions, when executed by the processor, cause the electronic device to:
display a thumbnail image correspond to the first image on at least a portion of an area in which the first image is displayed.

6. The electronic device of claim 5, wherein the instructions, when executed by the processor, cause the electronic device to:
display a distinguish form with the thumbnail image.

7. The electronic device of claim 5, wherein the instructions, when executed by the processor, cause the electronic device to:
receive a third image including at least one subject from the camera having a second angle of view, and
display the third image on at least a portion of an area in which the first image is displayed.

8. The electronic device of claim 1, wherein the instructions, when executed by the processor, cause the electronic device to:
generate a fourth image in which the second subject is cropped depending on a region of ROI,
display the fourth image on at least a portion of an area in which the first image is displayed, and
upon receiving a touch input for selecting the fourth image, display the selected fourth image on the area in which the first image is displayed.

9. The electronic device of claim 1, wherein the instructions, when executed by the processor, cause the electronic device to:
display an identifier on the ROI for the first subject.

10. The electronic device of claim 1, wherein the instructions, when executed by the processor, cause the electronic device to:
recommend the identified subjects in accordance with the recommendation priority, when identifying the first subject and the second subject in the first image.

11. A photographing method using a multi-camera of an electronic device, the method comprising:
obtaining a first image including a plurality of subjects using the camera having a first angle of view;

identifying a first subject and a second subject in the first image;

generate a second image in which the first subject is cropped depending on a predetermined region of interest (ROI) selected by the electronic device according to a type of subject of the first subject; and displaying the second image on at least a portion of an area in which the first image is displayed, the second image displayed with a boundary having a color selected according to a predetermined priority of the first subject.

12. The method of claim 11, further comprising:

receiving a user input for selecting the second subject on the first image; and determining that a photographing target is changed to the second subject based on the user input.

13. The method of claim 12, further comprising:

in response to receiving the user input for selecting the second subject, re-identifying, tracking, and photographing the second subject.

14. The method of claim 12, further comprising:

upon receiving the user input, removing the ROI of the first subject; and displaying a ROI of the second subject.

15. The method of claim 11, further comprising:

displaying a thumbnail image correspond to the first image on at least a portion of an area in which the first image is displayed.

16. The method of claim 15, further comprising:

displaying a distinguish form with the thumbnail image.

17. The method of claim 15, further comprising:

receiving a third image including at least one subject from the camera having a second angle of view, and displaying the third image on at least a portion of an area in which the first image is displayed.

18. The method of claim 11, further comprising:

generating a fourth image in which the second subject is cropped depending on a region of ROI;

displaying the fourth image on at least a portion of an area in which the first image is displayed; and upon receiving a touch input for selecting the fourth image, displaying the selected fourth image on the area in which the first image is displayed.

19. The method of claim 11, further comprising:

displaying an identifier on the ROI for the first subject.

20. The method of claim 11, further comprising:

recommending the identified subjects in accordance with the recommendation priority, when identifying the first subject and the second subject in the first image.

* * * * *